(12) United States Patent
Nishio et al.

(10) Patent No.: US 7,068,818 B2
(45) Date of Patent: Jun. 27, 2006

(54) CONTROL FOR PRINTING AND IMAGE PROCESSING

(75) Inventors: Satoru Nishio, Nagano-ken (JP); Masanori Saito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 261 days.

(21) Appl. No.: 10/334,597

(22) Filed: Dec. 30, 2002

(65) Prior Publication Data
US 2003/0151755 A1 Aug. 14, 2003

Related U.S. Application Data

(63) Continuation of application No. PCT/JP02/02448, filed on Mar. 14, 2002.

(30) Foreign Application Priority Data
Mar. 15, 2001 (JP) .............................. 2001-074648

(51) Int. Cl.
*G06K 9/00* (2006.01)
(52) U.S. Cl. ...................... 382/112; 382/254
(58) Field of Classification Search ............... 382/112, 382/254, 302, 305, 306, 307, 317; 358/1.6, 358/3.26, 3.27
See application file for complete search history.

(56) References Cited

U.S. PATENT DOCUMENTS 6,011,547 A * 1/2000 Shiota et al. ............... 345/327
6,504,960 B1 * 1/2003 Takahashi ................... 382/305
6,628,422 B1 * 9/2003 Ouchi ......................... 358/1.6
6,836,565 B1 * 12/2004 Nishikawa .................. 382/167

FOREIGN PATENT DOCUMENTS

| JP | 06-8537 A | * | 1/1994 |
| JP | 10-233920 A | * | 9/1998 |
| JP | 2000-4353 A | * | 1/2000 |
| JP | 2000-134390 A | | 5/2000 |
| JP | 2000-152067 A | * | 5/2000 |

OTHER PUBLICATIONS

Abstract of Japanese Patent Publication 10-191246, Pub. Date: Jul. 21, 1998, Patent Abstracts of Japan.
Abstract of Japanese Patent Publication 10-226139, Pub. Date: Aug. 25, 1998, Patent Abstracts of Japan.

* cited by examiner

Primary Examiner—Andrew W. Johns
(74) Attorney, Agent, or Firm—Martine Penilla & Gencarella LLP

(57) ABSTRACT

A CPU 150 in a personal computer PC acquires printing conditions stored in a RAM 151 set by a printer driver for controlling a printing operation in a color printer 20. The CPU 150 searches for set printing conditions, determines whether automatic image quality adjustment has been turned ON by the printer driver, and if it is determined that it has, the CPU 150 determines whether automatic image quality adjustment by an image processing application being executed is required. If it is determined that automatic image quality adjustment by the application is required, the CPU 150 sends an instruction to the printer driver to turn OFF the automatic image quality adjustment which is ON.

29 Claims, 14 Drawing Sheets

CONTROL FOR PRINTING AND IMAGE PROCESSING

CLAIM FOR PRIORITY

This application claims priority under 35 U.S.C. §§ 120 and 365(c) as a continuation application of prior International Application PCT/JP02/02448, which was filed on Mar. 14, 2002, and which was not published in English under PCT Article 21(2). The disclosure of the prior international application is incorporated herein by reference.

TECHNICAL FIELD

The present invention relates to image adjustment technology for adjusting the image quality of an image file.

BACKGROUND ART

The image quality of image data generated by a digital still camera (DSC), digital video camera (DVC), scanner or the like can be arbitrarily adjusted using an image retouching application on a personal computer. In general, an image retouching application is provided with an image adjustment function for automatically adjusting the image quality of image data, and by using this image adjustment function, the image quality of image data outputted by an output device can be easily improved. Output devices for image files that are known include, for example, a CRT, LCD, printer, projector and television receiver.

Printer drivers for controlling the movement of a printer, which is an output device, are also provided with a function for automatically adjusting the image quality of image data, and by using such a printer driver as well, the image quality of printed image data can be easily improved.

Nevertheless, the automatic adjustment of image quality by an image retouching application and the automatic adjustment of image quality by a printer driver are generally run independently from each other when they process. Thus, the image quality of image data which had already undergone automatic adjustment by an image retouching application, for example, would sometimes be automatically corrected again by a printer driver. In such cases, the automatic adjustment by the printer driver of the image quality of image data whose image quality had already been adjusted sometimes caused a loss in image quality instead. In particular, in the automatic adjustment processing of image quality in conjunction with image data analysis, there was the problem that the image data whose image quality had already been corrected was believed to have been the original image data, so suitable image quality adjustment could not be carried out.

Further, if standardization processing of the image quality (correction processing to a standard image quality) of image data on which image quality adjustment processing has already been carried out by one image processing device, not limited to the relationship of a retouching application and a printer driver, is carried out by some other image processing device, not only will the image quality adjustment carried out by the first image processing device be reflected in the outputted image, but this may invite a drop in the image quality.

DISCLOSURE OF THE INVENTION

The present invention was devised to solve the problems, and it is an object thereof to implement suitable automatic adjustment of image quality when a plurality of automatic adjustments of image quality are possible. It is also an object thereof to suitably implement standardized processing of image quality on image data having already undergone image quality adjustment.

A first aspect of the present invention for solving the problems provides a computer readable medium storing a computer program code is recorded for controlling the output state of image data in a printing device. The printing control program codes on a computer readable medium according to the first aspect of the present invention is characterized by causing a computer to implement a function for analyzing the image data and acquiring characteristic parameters showing characteristics of the image data; and a function for implementing either the adjustment of image quality of the image data by print job with consideration of the acquired characteristic parameters, or the adjustment of image quality of the image data using an image processing program for adjusting image quality of the image data by image datum with consideration of the characteristic parameters.

A computer readable medium by a computer according to the first aspect of the present invention implements either the adjustment of image quality of image data by print job with consideration of acquired characteristic parameters, or the adjustment of image quality of image data using an image processing program for adjusting image quality of image data by image datum with consideration of characteristic parameters, so only one image quality adjustment is carried out even when a plurality of image quality adjustments are possible, and it is possible to automatically correct image quality in a suitable manner. A printing control program may be called a printer driver, and an image processing program may be called an image processing application. Also, in addition to the selection of an image quality adjustment between a printing control program and an image processing program, the selection of image quality adjustment between one image processing program and another image processing program is also included.

A second aspect of the present invention provides a computer readable medium storing an image processing program codes is recorded for implementing image processing on an image file containing image data. In a computer readable medium according to the second aspect of the present invention, the image processing program is characterized by causing a computer to implement a function for analyzing the image data and acquiring characteristic parameters showing characteristics of the image data; and a function for implementing either the adjustment of image quality of the image data by image datum with consideration of the acquired characteristic parameters, or the adjustment of image quality of the image data by print job in a printing control program for controlling the print status of the image data are realized in a computer.

A computer readable medium according to the second aspect of the present invention implements either adjustment of image quality of image data by image datum with consideration of acquired characteristic parameters or adjustment of image quality by print job of image data in a printing control program for controlling the print status of image data, so only one image quality adjustment is carried out even when a plurality of image adjustments are possible, and it is possible to automatically correct image quality in a suitable manner.

A third aspect of the present invention provides a computer readable medium storing an image processing program codes is recorded for implementing image processing on an image file containing image data. On a computer readable medium according to the third aspect of the present invention, the image processing program is characterized by causing a computer to implement a function for analyzing the image data and acquiring characteristic parameters showing characteristics of the image data, a first adjustment function for adjusting the image quality of the image data with consideration of the acquired characteristic parameters by image datum, a second adjustment function for adjusting the image quality of the image data with consideration of the acquired characteristic parameters by print job, and a first priority function for giving priority to image quality adjustment by the first adjustment function over image quality adjustment by the second adjustment function are realized with a computer.

A computer readable medium according to the third aspect of the present invention comprises a first priority function for giving priority to image quality adjustment by the first adjustment function over image quality adjustment by the second adjustment function, so even when a plurality of image quality adjustments are possible, only the image quality adjustment for adjusting the image quality of the image data by image datum is carried out, and it is possible to automatically correct the image quality suitably and with greater accuracy.

A fourth aspect of the present invention provides a computer readable medium storing an image processing program codes is recorded for implementing image processing on image data. In a computer readable medium according to the fourth aspect of the present invention, the image processing program is characterized by causing a computer to implement a first image quality adjustment function for implementing image quality adjustment of the image data using image processing control information showing image processing conditions for the image data; a second image quality adjustment function for analyzing the image data, acquiring characteristic parameters showing characteristics of the image data, and implementing image quality adjustment on the image data using the acquired characteristic parameters; and a function for prohibiting or decreasing the image quality adjustment on image data by the second image quality adjustment function when the image processing control information is associated with the image data are realized by a computer.

According to the computer readable medium according to the fourth aspect of the present invention, when image processing control information is associated with image data, it is possible to implement image quality adjustment giving priority to the image processing control information for the image data.

A fifth aspect of the present invention provides a printing control device for controlling the output state of image data in a printing device. The printing control device according to the fifth aspect of the present invention is characterized by the fact of comprising characteristic parameter acquisition unit for analyzing the image data and acquiring characteristic parameters showing characteristics of the image data; image quality adjustment unit for adjusting the image quality of image data by print job with consideration to the acquired characteristic parameters; duplicate image quality adjustment prevention unit for allowing either image quality adjustment by an image processing operation for implementing image quality adjustment on the image data by image datum with consideration to the characteristic parameters, or image equality adjustment by the image quality adjustment unit; and transmission unit for transmitting the image adjusted image data to the printing device.

According to the printing control device according to the fifth aspect of the present invention, it is possible to obtain operation effects similar to those of a computer readable medium on which is recorded a printing control program according to the first aspect of the present invention. Also, the printing control device according to the fifth aspect of the present invention may be realized in a variety of aspects similar to a computer readable medium on which is recorded a printing control program according to the first aspect of the present invention.

A sixth aspect of the present invention provides an image processing device for implementing image processing on an image file containing image data. The image processing device according to the sixth aspect of the present invention is characterized by the fact of comprising characteristic parameter acquisition unit for analyzing the image data and acquiring characteristic parameters showing characteristics of the data; image quality adjustment unit for adjusting the image quality of the image data by image datum with consideration of the acquired characteristic parameters; image quality adjustment allowance unit for allowing image quality adjustment of the image data by either image quality adjustment by print job of the image data by a printing control operation for controlling the print status of the image data or image quality adjustment by the image quality adjustment unit; and transmission unit for transmitting image data whose image quality has been adjusted by the allowed image quality adjustment to the printing device.

According to the image processing device of the sixth aspect of the present invention, it is possible to obtain operation effects similar to those of a computer readable medium on which an image processing program is recorded according to the second aspect of the present invention. Also, the image processing device according to the sixth aspect of the present invention may be realized in a variety of modes similar to a computer readable medium on which an image processing program is recorded according to the second aspect of the present invention.

A seventh aspect of the present invention provides an image processing device for implementing image processing on an image file containing image data. The image processing device according to the seventh aspect of the present invention is characterized by the fact of comprising characteristic parameter acquisition unit for analyzing the image data and acquiring characteristic parameters showing characteristics of the image data; first image quality adjustment unit for adjusting the image quality of the image data by image datum with consideration to the acquired characteristic parameters; second image quality adjustment unit for adjusting the image quality of the image data by print job with consideration of the acquired characteristic parameters; first priority unit for giving priority to image quality adjustment by the first image quality adjustment unit over image quality adjustment by the second image quality adjustment unit; and transmission unit for transmitting the image data which has undergone the image quality adjustment to a printing device.

According to the image processing device of the seventh aspect of the present invention, operation effects similar to those of a computer readable medium on which an image processing program is recorded according to the third aspect of the present invention can be obtained. Also, the image processing device according to the seventh aspect of the present invention can be realized in a variety of modes similar to a computer readable medium on which an image processing program is recorded according to the third aspect of the present invention.

An eighth aspect of the present invention provides a printing control method for controlling the output state of image data in a printing device. The printing control method according to the eighth aspect of the present invention is characterized by the fact that the image data are analyzed, characteristic parameters showing characteristics of the image data are acquired, and either adjustment of the image quality of the image data by print job with consideration to the acquired characteristic parameters or adjustment of the image quality of the image data by an image processing program for adjusting the image quality of the image data by image datum with consideration to the characteristic parameters is carried out.

According to the printing control method of the eighth aspect of the present invention, operation effects similar to those of a computer readable medium on which a printing control program is recorded according to the first aspect of the present invention can be obtained. Also, the printing control method according to the eighth aspect of the present invention can be realized in a variety of modes similar to a computer readable medium on which a printing control program is recorded according to the first aspect of the present invention.

On the printing control method of the eighth aspect of the present invention, the step of implementing either the adjustment of image quality of the image data by print job, or the adjustment of image quality of the image data by image datum may also include, determining whether image quality adjustment of the data by the image processing program has been selected, and not implementing image quality adjustment by the print job when it is determined that the image quality adjustment of the image data in the image processing program is selected to be realized by a computer. In such a case, image quality adjustment is carried out in the image processing program, and it is possible to implement image quality adjustment by image datum with high accuracy.

On the printing control method of the eighth aspect of the present invention, the step of image processing control information used during image processing is associated with the image data, and adjustment of the image quality of the image data by the image processing program may be carried out using the image processing control information. In such a case, it is possible to specify the image processing conditions of the image data with the image processing control information.

A ninth aspect of the present invention provides an image processing method for implementing image processing on an image file containing image data. The image processing method according to the ninth aspect of the present invention is characterized by the fact that the image data are analyzed, characteristic parameters showing characteristics of the image data are acquired, and either adjustment of the image quality of the image data by image datum with consideration of the acquired characteristic parameters or adjustment of the image quality of the image data by a printing control program for controlling the printing state of the image data for controlling the image quality of the image data by print job with consideration of the characteristic parameters is carried out.

According to the image processing method of the ninth aspect of the present invention, operation effects similar to those of a computer readable medium on which an image processing program is recorded according to the second aspect of the present invention can be obtained. Also, the image processing method according to the ninth aspect of the present invention can be realized in a variety of modes similar to a computer readable medium on which the image processing program is recorded according to the second aspect of the present invention.

In the image processing method of the ninth aspect of the present invention, the step of implementing either the adjustment of image quality of the image data by print job or the adjustment of image quality of the image data by image datum may includes, determining whether image quality adjustment by the printing control program has been selected, canceling the selection of image adjustment by the printing control program when it has been determined that image quality adjustment by the printing control program has been selected, and prohibiting the image control adjustment of the image data by print job, and implementing image quality adjustment by image datum on the image data may be realized through a computer. In such a case, the image quality adjustment is carried out by the image quality adjustment function in the image processing program, and it is possible to implement image quality adjustment by image datum with higher accuracy.

In the image processing method of the ninth aspect of the present invention, the step of implementing either adjustment of the image quality of the image data by print job, or adjustment of the image quality of the image data by image datum may include, determining whether image quality adjustment by the printing control program has been selected, and prohibiting the image quality adjustment by image datum when it is determined that image quality adjustment by the printing control program has been selected may also be realized by a computer. In such a case, the image quality adjustment is carried out by the printing control program, and image quality adjustment can easily be carried out by print job.

In the image processing method of the ninth aspect of the present invention, image processing control information used during image processing may be associated with the image data, and the function to implement image quality adjustment by image datum on the image data may be carried out using the image processing control information. In such a case, conditions for image processing of the image data may be specified by the image processing control information.

A tenth aspect of the present invention provides an image data generation device for generating image data. The image data generation device according to the tenth aspect of the present invention is characterized by the fact of comprising image data generation unit for generating image data, image quality adjustment unit for implementing image quality adjustment processing on the generated image data, and output unit for associating information for the executed image quality adjustment processing and the generated image data and outputting same.

According to the image data generation device of the tenth aspect of the present invention, it is possible to associate generated image data and information for image quality adjustment processing carried out on the image data and output same. Thus, it is possible to send the content of the image quality adjustment carried out on the image data to the image processing device.

An 11th aspect of the present invention provides an image data generation device for generating image data. The image data generation device according to the 11th aspect of the present invention is characterized by the fact of comprising setting unit for setting up image quality adjustment processing to be carried out on image data, image data generation unit for implementing the set image quality adjustment processing and generating image data, and output unit for associating the generated image data and information for the executed image quality adjustment processing and outputting same.

According to the image data generation unit of the 11th aspect of the present invention, it is possible to associate generated image data and information for image quality adjustment processing carried out on the image data and output same. Thus, it is possible to send the content of the image quality adjustment carried out on the image data to an image processing device.

In the image data generation device according to the tenth or 11th aspect of the present invention, the information for image quality adjustment processing may contain contrast, color saturation or sharpness adjustment information.

A 12th aspect of the present invention provides an image processing device for implementing image processing on image data to which information for executed image quality adjustment processing is associated. The image processing device according to the 12th aspect of the present invention is characterized by the fact of comprising image quality adjustment unit for adjusting image quality of the image data based on a predetermined standard, and image quality adjustment limiting unit for prohibiting or decreasing the image quality adjustment of the image data by the image quality adjustment unit based on the information for image quality adjustment processing associated with the image data.

According to the image processing device of the 12th aspect of the present invention, it is possible to prohibit or decrease image quality adjustment based on a predetermined standard based on information for image quality adjustment processing carried out on image data. Thus, it is possible to prevent or decrease a drop in the image quality due to the execution of duplicate image quality adjustment on image data which has already undergone image quality adjustment processing.

In the image processing device according to the 12th aspect of the present invention, the information for image quality processing may contain adjustment information relating to any of at least the contrast, color saturation and sharpness, and the image quality adjustment limiting unit may prohibit or decrease the adjustment of image quality corresponding to the adjustment information relating to the image quality contained in the information for image quality adjustment processing. In such a case, it is possible to prohibit or decrease image quality adjustment based on a predetermined standard for only adjusted image quality, so image quality adjustment can be carried out based on a predetermined standard for other image quality. Thus, it is possible to prevent or decrease a drop in image quality due to duplicated image quality adjustment on image data which has already undergone image quality adjustment processing, and also, the optimization (standardization) of image quality can be provided.

The 13th aspect of the present invention provides an image processing system for implementing image processing on image data. The image processing system according to the 13th aspect of the present invention is characterized by the fact of comprising image data acquisition unit for acquiring image data, image quality adjustment unit for implementing image quality adjustment on the acquired image data, a first image processing device comprising output unit for associating image data which has undergone the image quality adjustment and the information for executed image quality adjustment processing and outputting same, acquisition unit for acquiring the outputted image data and information for image quality adjustment processing associated with the image data, image quality adjustment unit for adjusting image quality of the image data based on a predetermined standard, and a second image processing device comprising image quality adjustment limiting unit for prohibiting or decreasing image quality adjustment on the image data by the image quality adjustment unit based on information for image quality adjustment processing associated with the image data.

According to the image processing system of the 13th aspect of the present invention, it is possible to prevent or decrease a drop in image quality due to duplicated image quality adjustment on image data which has already undergone image quality adjustment by the first image processing device.

In the image processing system according to the 13th aspect of the present invention, image quality adjustment processing carried out by the image quality adjustment unit of the first image processing device may include image quality adjustment processing relating to at least one image quality out of contrast, color saturation and sharpness; the information for image quality adjustment processing may include adjustment information relating to at least one of the executed image qualities of contrast, color saturation and sharpness; the adjustment of the image quality of the image data based on a predetermined standard carried out by the image quality adjustment unit of the image processing device may include adjustment of image quality relating to at least one image quality out of contrast, color saturation and sharpness; and the image quality adjustment limiting unit of the second image processing device may prohibit or decrease the adjustment of image quality corresponding to adjustment information contained in the information for image quality adjustment processing.

According to the image processing system of the 13th aspect of the present invention, it is possible to prevent or decrease a drop in image quality due to duplicated image quality adjustment on image data which has already undergone image quality adjustment processing, and the optimization (standardization) of image quality can be provided.

In the image processing system according to the 13th aspect of the present invention, the first image processing device may be a digital still camera, and the second image processing device may be a personal computer or a printer.

A 14th aspect of the present invention provides an image generation method for generating image data. The image data generation method according to the 14th aspect of the present invention is characterized by the fact of generating image data, implementing image quality adjustment processing on the generated image data, associating the content of the executed image quality adjustment processing and the generated image data, and outputting same. According to the image generation method of the 14th aspect of the present invention, it is possible to obtain operation effects similar to those of the image data generation device according to the tenth aspect of the present invention, and the image generation method according to the 14th aspect of the present invention can be realized in a variety of modes similar to the image data generation device according to the tenth aspect of the present invention.

A 15th aspect of the present invention provides an image data generation method for generating image data. The image data generation method according to the 15th aspect of the present invention is characterized by the fact of implementing image quality adjustment processing to be carried out on set image data, generating image data, associating information for the executed image quality adjustment processing and the generated image data and outputting same. According to the image generation method of the 15th aspect of the present invention, it is possible to obtain operation effects similar to those of the image data generation device according to the 11th aspect of the present invention, and the image generation method according to the 15th aspect of the present invention may be realized in a variety of modes similar to that of the image data generation device according to the 11th aspect of the present invention.

A 16th aspect of the present invention provides a method for implementing image processing on image data. The image data generation method according to the 16th aspect of the present invention is characterized by the fact of determining whether information for the executed image quality adjustment processing is associated with the acquired image data, and of prohibiting or decreasing adjustment of the image quality of the image data based on a predetermined standard if the information for the executed image quality adjustment processing is associated with the acquired image data. According to the image processing method of the 16th aspect of the present invention, it is possible to obtain operation effects similar to those of the image processing device according to the 12th aspect of the present invention, and the image processing method according to the 16th aspect of the present invention can be realized in a variety of modes similar to the image processing device according to the 12th aspect of the present invention.

In the method according to the 16th aspect of the present invention, the information for image quality adjustment processing may contain information for image quality adjustment relating to at least one image quality out of contrast, contrast saturation and sharpness; the determination of whether the information for the executed image quality adjustment processing is associated with the acquired image data may be carried out on each piece of information for each image quality adjustment, and the prohibition or decrease in adjustment of the image quality of the image data based on the predetermined standard may be carried out on each piece of information for each image quality adjustment contained in the information for the image quality adjustment processing.

A 17th aspect of the present invention provides an image processing method for implementing image processing on image data. The method according to the 17th aspect of the present invention is characterized by the fact of acquiring image data; implementing image quality adjustment on image data; associating the image data having already undergone the image quality adjustment and information for the executed image quality adjustment processing and outputting same; acquiring the outputted image data and the information for the image quality control processing associated with the image data; and, based on the information for image quality adjustment processing associated with the image data, prohibiting or decreasing adjustment of the image quality on the image data based on a predetermined standard. According to the image processing method of the 17th aspect of the present invention, operation effects similar to those of the image processing system according to the 13th aspect of the present invention can be obtained, and the image processing method according to the 17th aspect of the present invention can be realized in a variety of modes similar to the image processing system according to the 13th aspect of the present invention.

An 18th aspect of the present invention provides a computer readable medium storing an image processing program is recorded for implementing image processing on image data associated with information for executed image quality adjustment processing. On a computer readable medium according to the 18th aspect of the present invention, the image processing program is characterized by causing a computer to implement function for adjusting image quality of the image data based on a predetermined standard, and a function for prohibiting or decreasing the image quality adjustment on the image data by the function for adjusting the data based on information for the image quality adjustment processing associated with the image data to be executed by a computer. According to a computer readable medium on which an image processing program is recorded according to the 18th aspect of the present invention, it is possible to obtain operation effects similar to those of the image processing device according to the 12th aspect of the present invention, and a computer readable medium on which an image processing program is recorded according to the 18th aspect of the present invention can be realized in a variety of modes similar to the image processing device according to the 12th aspect of the present invention.

The 10th, 11th and 13th aspects of the present invention can be realized as programs. Also, the aspects with a medium readable by a computer on which one of the programs is written may be realized as a program. Further, adjustment of the image quality of image data based on a predetermined standard unit correction processing to eliminate or decrease the difference between image quality of image data and a standard image quality.

FAVORABLE MODES FOR WORKING THE INVENTION

Figure 1:
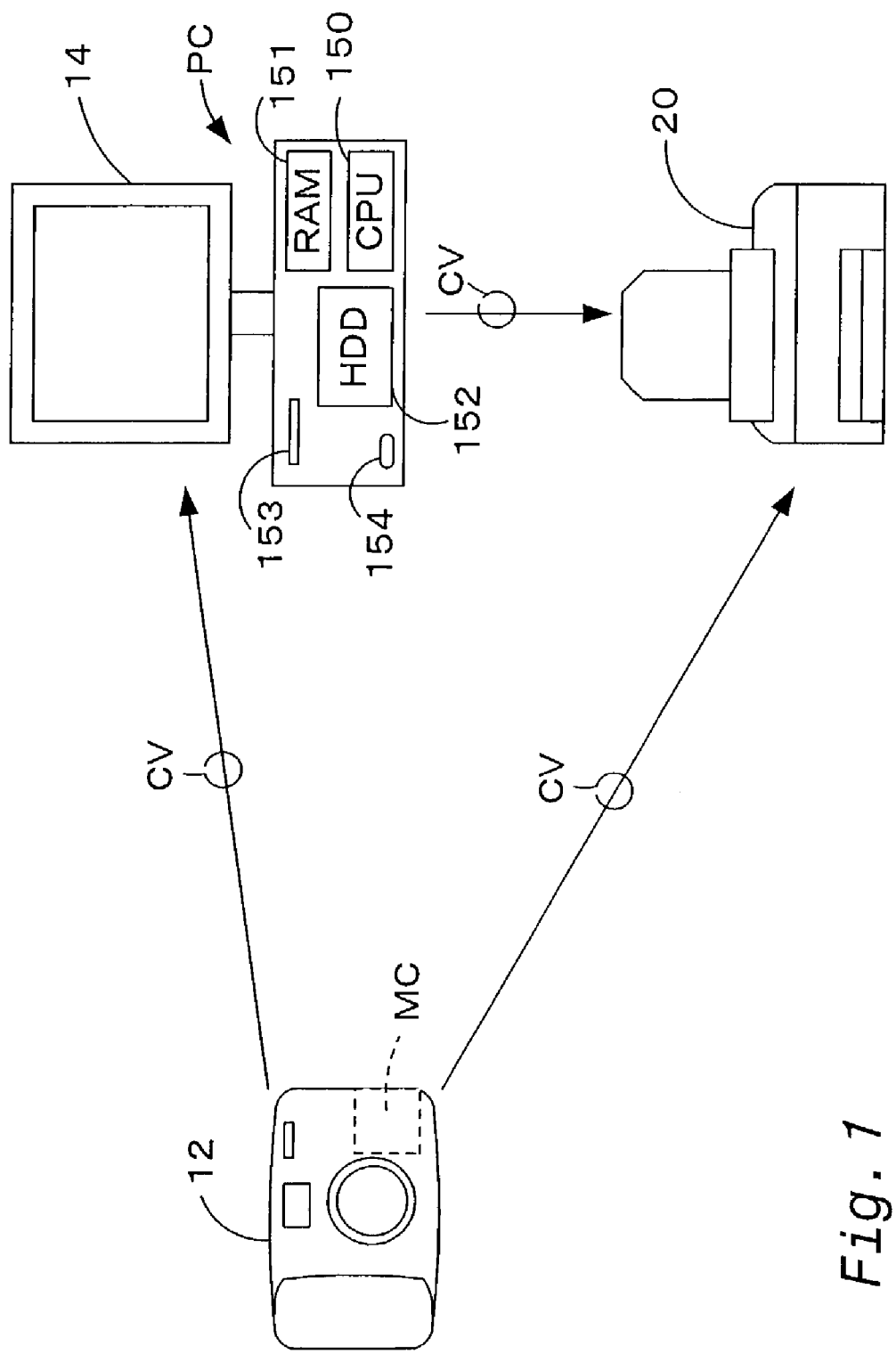
FIG. 1 is an explanatory view showing one example of an image data processing system to which the image processing device according to the present embodiments can be applied.
Figure 2:
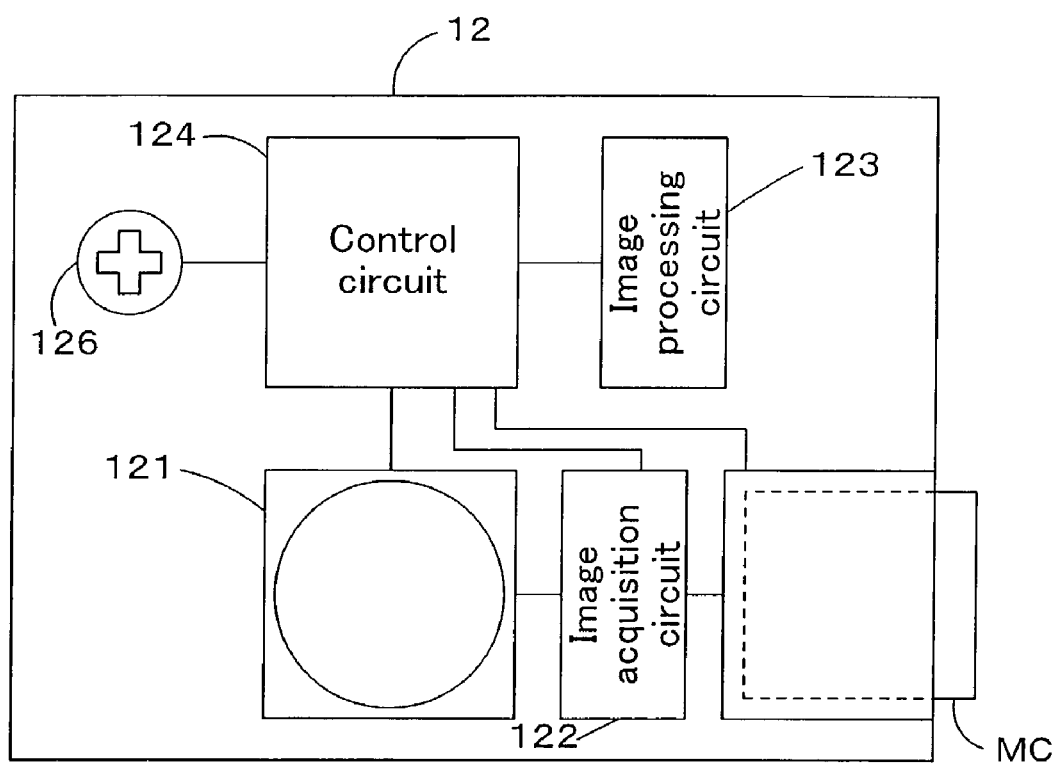
FIG. 2 is a block view showing an outline construction of a digital still camera capable of generating image files (image data) processed by the image processing device according to the present embodiments.
Figure 3:
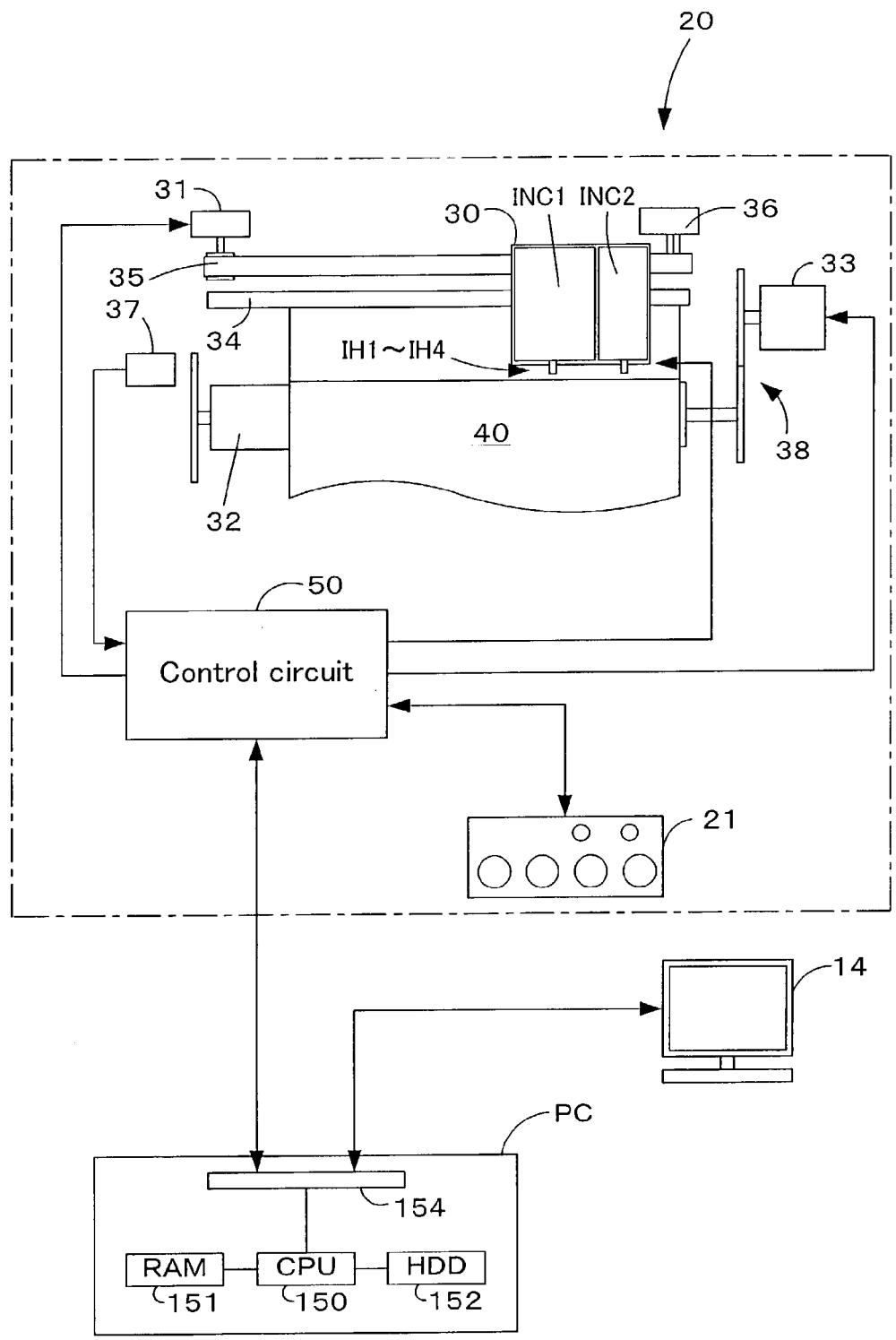
FIG. 3 is an outline view showing the internal construction of a color printer applicable to the present embodiments.
Figure 4:
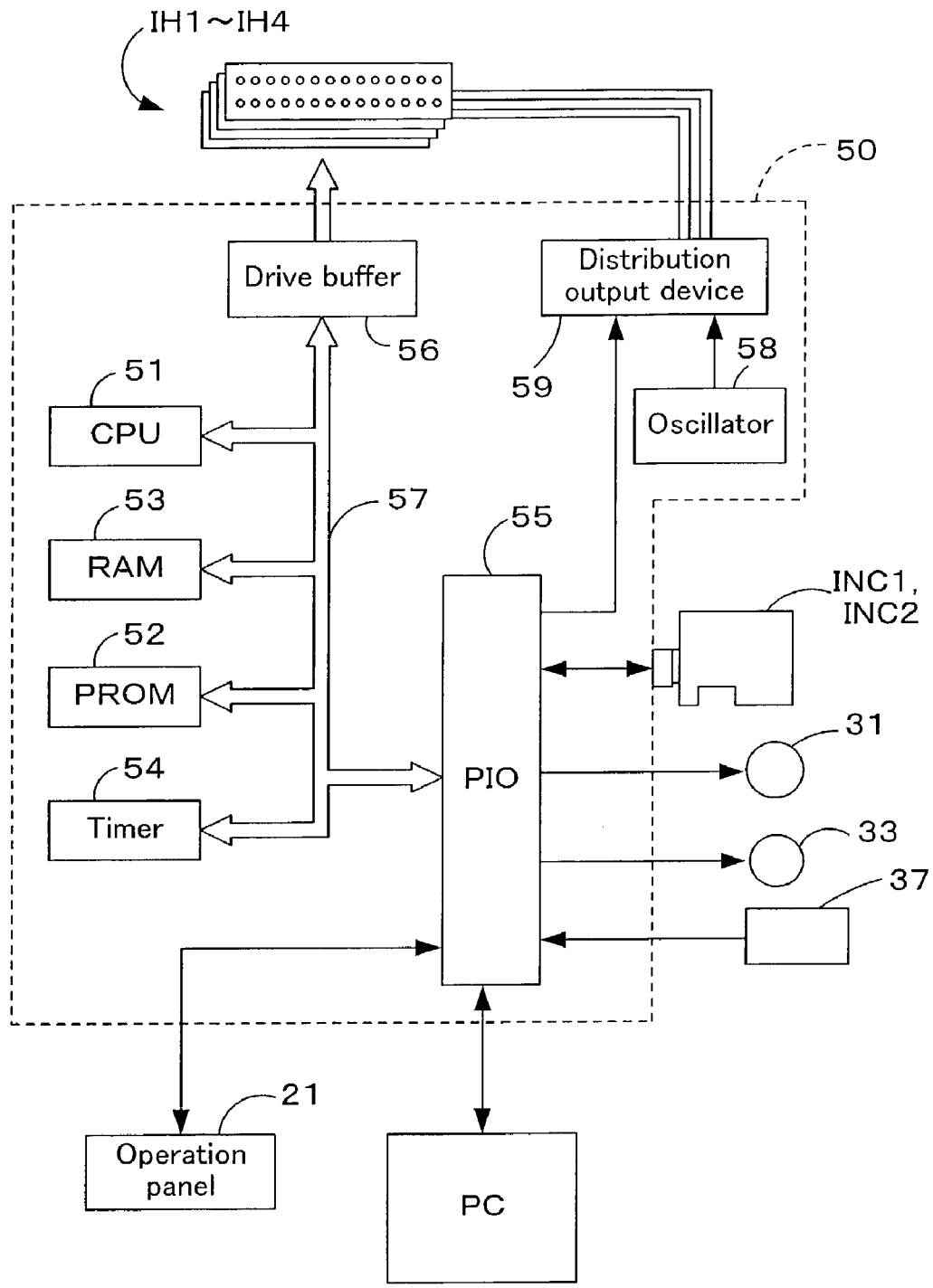
FIG. 4 is a block view showing the internal construction of a control circuit in the color printer 20.

The image processing device according to the present invention is described below in the following sequence based on a number of embodiments while referring to the Drawings.
- A. The construction of the image processing system
- B. The image file construction in the first embodiment
- C. Image processing in the image processing device according to the first embodiment
- D. The second embodiment
- E. Other embodiments A. The Construction of the Image Processing System The configuration of an image processing system to which the image processing device according to the present embodiments may be applied is described with reference to FIGS. 1 to 4. FIG. 1 is an explanatory view showing one example of an image processing system to which the image processing device according to the present embodiments may be applied. FIG. 2 is a block view showing an outline configuration of a digital still camera capable of generating an image file (image data) for output by the image processing device according to the present embodiments. FIG. 3 is an outline view showing the internal configuration of a color printer which may be applied to the present embodiments. FIG. 4 is a block view showing the internal structure of a control circuit for the color printer 20.

The image processing system 10 comprises a digital still camera 12 as an input device for generating an image file, a personal computer PC as an image processing device for implementing image processing based on the image file generated by the digital still camera 12 and outputting print image data, and a color printer 20 as an output device for outputting print image data. In addition to the personal computer PC, a stand-alone type printer, for example, may be used as the image processing device. Also, in addition to the printer 20, a CRT display, LCD display or other monitor 14, a projector or the like may be used as the output device. In the below description, the color printer 20 is used connected to the personal computer PC as the output device.

The personal computer PC is a computer of the type generally used, and is equipped with a CPU 150 for executing an image processing program according to the present invention, a RAM 151 for temporarily storing operation results, image data, etc., from the CPU 150, and a hardware disk drive (HDD) 152 storing an image processing program. The personal computer PC is equipped with a card slot 153 for loading a memory card MC and an input/output terminal 154 for connecting a connection cable from the digital still camera 12 or the like.

As shown in FIG. 2, the digital still camera 12 is for acquiring images by causing optical information to form an image in a digital device (a CCD or photomultiplier tube), and is equipped with an optical circuit 121 comprising a CCD or the like for collecting optical information as shown in FIG. 2, an image acquisition circuit 122 for controlling the optical circuit 121 and acquiring images, an image processing circuit 123 for processing acquired digital images, and a control circuit 124 equipped with a memory for controlling circuits. The digital still camera 12 saves acquired images as digital data to the memory card MC as a storage device. The save format of the image data in the digital still camera 12 is generally JPEG, but other save formats such as TIFF, GIF, BMP and RAW data may also be used.

The digital still camera 12 is also equipped with a selection/decision button 126 for setting the filming mode, for which a plurality of image processing control parametric values are set beforehand, in response to filming conditions as well as individual image processing control parameters such as brightness, contrast, exposure adjustment quantity (exposure adjustment value) and white balance; and a liquid crystal display 127 for previewing filmed images and setting the filming mode and the like using the selection/decision button 126.

The digital still camera 12 used in the present image processing system stores, in addition to image data GD, image processing control information GC for the image data as an image file GF in the memory card MC. More specifically, along with the image data GD at the time of filming, the image processing control information GC is automatically stored in the memory card MC as information automatically composing an image file GF.

The image file GF generated by the digital still camera 12 is transmitted to the color printer 20 through, for example, a cable CV and the computer PC, or through the cable CV. Alternately, the image file is transmitted to the color printer 20 through a connection via the computer PC in which the memory card MC on which the digital still camera 12 stored the image file is inserted in the memory slot, or by a direct connection of the memory card MC to the printer 20. The description below will be made based on the case where the memory card MC is connected or directly so to the personal computer PC The image output device used in the present embodiments, or in greater detail, the internal configuration of the color printer 20 will be described with reference to FIG. 3. The color printer 20 is capable of outputting color images, for example, a jet ink type printer which sprays inks having the four colors of cyan (C), magenta (M), yellow (Y) and black (K) to form an image through the formation of a dot pattern. Alternately, the color printer 20 may be an electrophotographic type which transfers/fixes color toner on a printing medium to form images. Instead of the four colors, the color inks light cyan (LC), light magenta (LM), and dark yellow (DY) may be used.

As illustrated, the color printer 20 comprises a mechanism for driving print heads IH1 to IH4 mounted on a carriage 30 and expelling ink or forming dots; a mechanism for moving the carriage 30 back and forth in the axial direction of a platen 32 using a carriage motor 31; a mechanism for feeding a cut paper 40 for printer using a paper feed motor 33; and a control circuit 50. The mechanism for moving the carriage 30 back and forth in the axial direction of the platen 32 comprises a sliding shaft 34 for holding the carriage 33 provided parallel to the axis of the platen 32, a pulley 36 holding between itself and the carriage motor 31 an endless drive belt 35, and the like.

The control circuit 50 appropriately controls the movement of the paper feed motor 33, the carriage motor 31, and the print heads IH1 to IH4 while exchanging signals with the operation panel 21 of the printer. An ink cartridge INC1 and an ink cartridge INC2 are loaded in the carriage 30. Black (K) ink is held in the ink cartridge INC1, and other inks, or more specifically, the three colors of ink cyan (C), magenta (M), and yellow (Y), are held in the ink cartridge INC2. As described above, light cyan (LC), light magenta (LM) and light yellow (LY) inks may also be used.

Next is a description of the internal configuration of the control circuit 50 in the color printer 20 with reference to FIG. 4. As illustrated, a CPU 51, a PROM 52, a RAM 53, a peripheral device input/output portion (PIO) 54, a timer 55, a drive buffer 56, and the like are provided inside the control circuit 50. The personal computer PC, the carriage motor 31, the paper feed motor 33, and an encoder 37 are connected to the PIO 54. The drive buffer 56 is used as a buffer for supplying dot-formation ON/OFF signals to the print heads IH1 to IH4. These are mutually connected with a bus 57, making the mutual exchange of data possible. Also, an oscillator 58 for outputting drive waveforms at a prescribed frequency, and a distribution output device 59 for distributing outputs from the oscillator 58 to the ink heads IH1 to IH4 for expelling ink with a prescribed timing are provided in the control circuit 50. The control circuit 50 outputs dot data to the driver buffer 56 using a prescribed timing while keeping in synch with movements of the paper feed motor 33 and the carriage motor 31.

B. The Image File Construction in the First Embodiment

Figure 5:
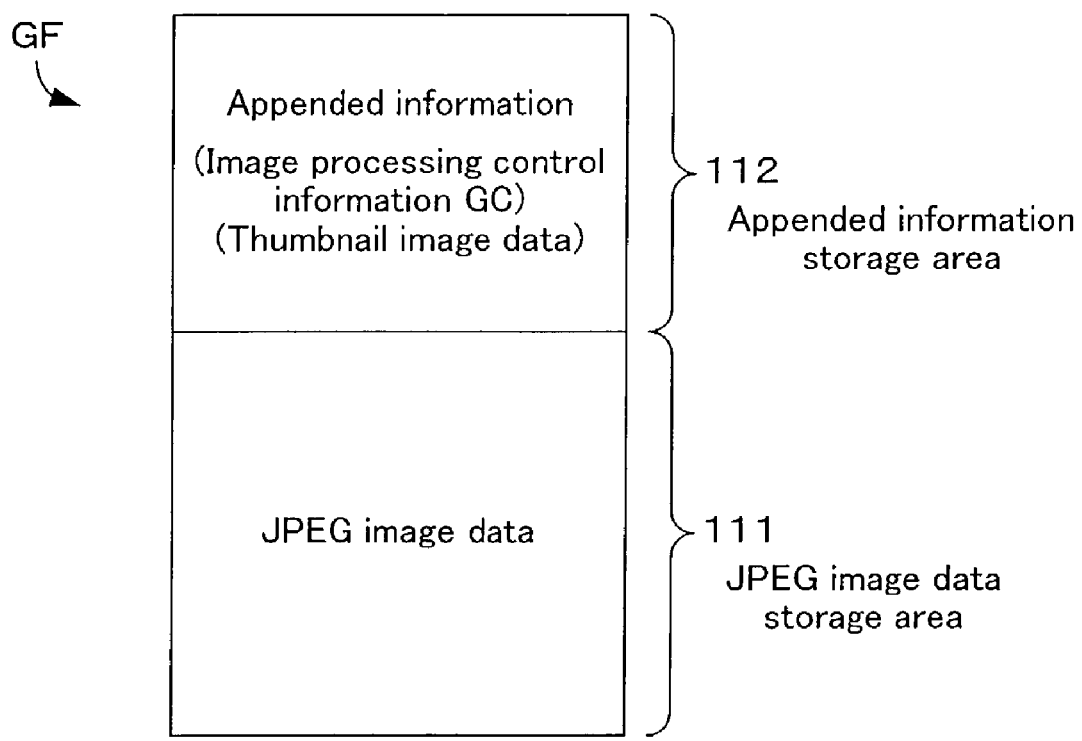
FIG. 5 is an explanatory view conceptually showing one example of the internal construction of an image file usable in the present embodiments.

A sketch of the configuration of an image file that can be used in the present embodiment will be described with reference to FIG. 5. FIG. 5 is an explanatory view conceptually showing one example of an internal configuration of the image file that can be used in the present embodiment. The image file GF according to the present embodiment can have a file structure conforming, for example, to the image file format standards (Exif) for digital still cameras. The specifications of Exif files are established by the JEITA (Japan Electronics and Information Technology Industries Association).

As an Exif file, the image file GF comprises a JPEG image data storage area 111 for storing image data in a JPEG format, and appended information storage area 112 for storing various information relating to the stored JPEG image data. The filming data and time, exposure, shutter speed, white balance, exposure correction value, target color space and other image processing control information GC referred to when outputting a JPEG image are stored in the appended information storage area 112. Thumbnail image data for the JPEG image stored in the JPEG image data storage area 111 are also stored in a TIFF format in the appended information storage area 112 in addition to the image processing control information GC. As is well known to persons skilled in the art, tags are used to specify data in Exif formatted files, and each datum may be called by the tag name. Terms such as file construction, data construction and storage area in the present embodiment mean the file or data image in a state where the file, data or the like is stored in the storage device.

The image processing control information GC is related to the image quality when the image data is generated (when filming occurs) by an image data generation device such as the digital still camera 12, and parameters relating to the exposure time, the ISO sensitivity, the aperture, the shutter speed and the focus distance which may be arbitrarily set by the user or automatically when filming, or image processing control parameters such as the exposure correction value, the white balance, the filming mode, and the target color space which may be arbitrarily set by the user may also be included.

In addition to the digital still camera 12, the image file GF according to the present embodiment may be generated by a digital video camera, scanner or other input device (image file generation device).

Figure 6:
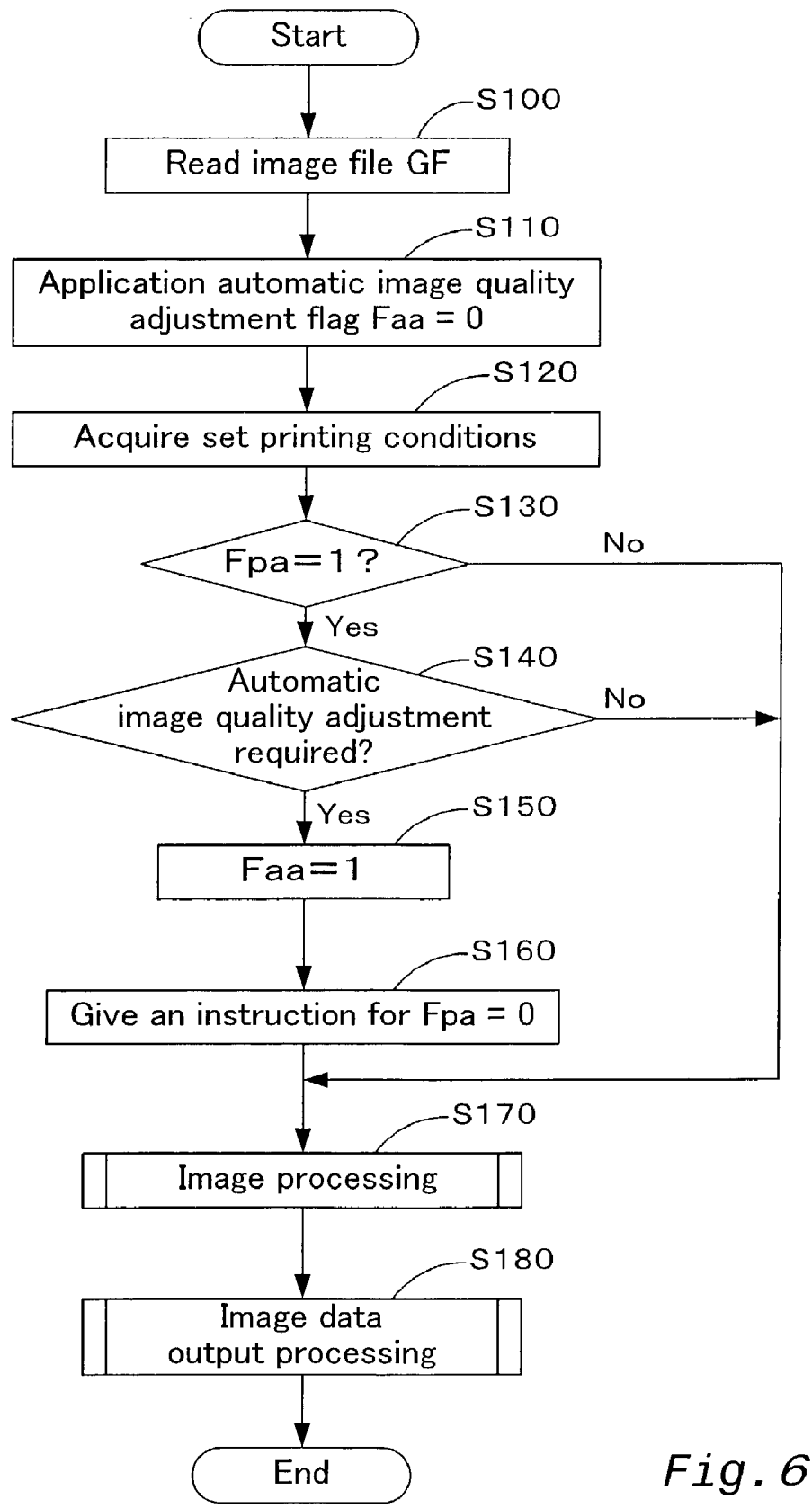
FIG. 6 is a flow chart showing the processing routine for image processing and printing control processing carried out by the personal computer PC according to the present embodiments.
Figure 7:
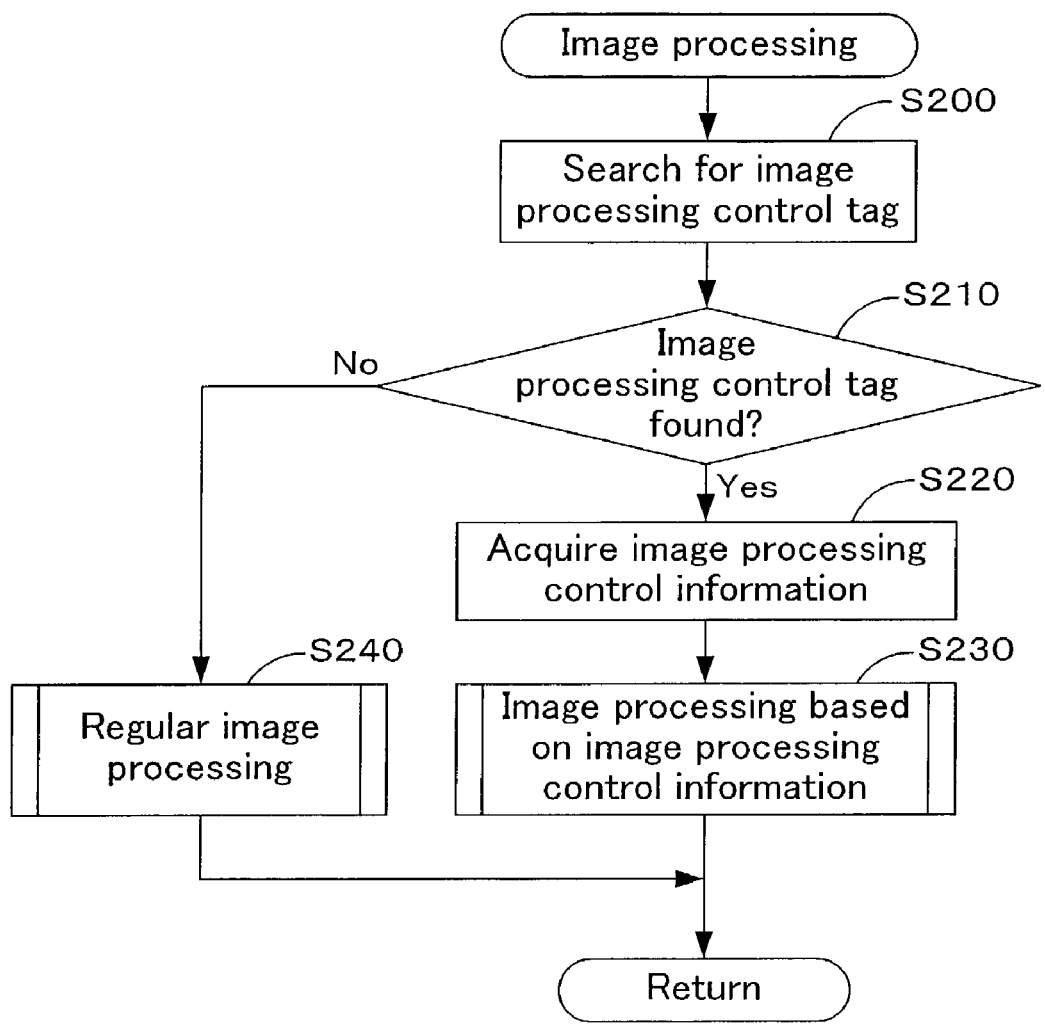
FIG. 7 is a flow chart showing the processing routine for image processing carried out by the personal computer PC.
Figure 8:
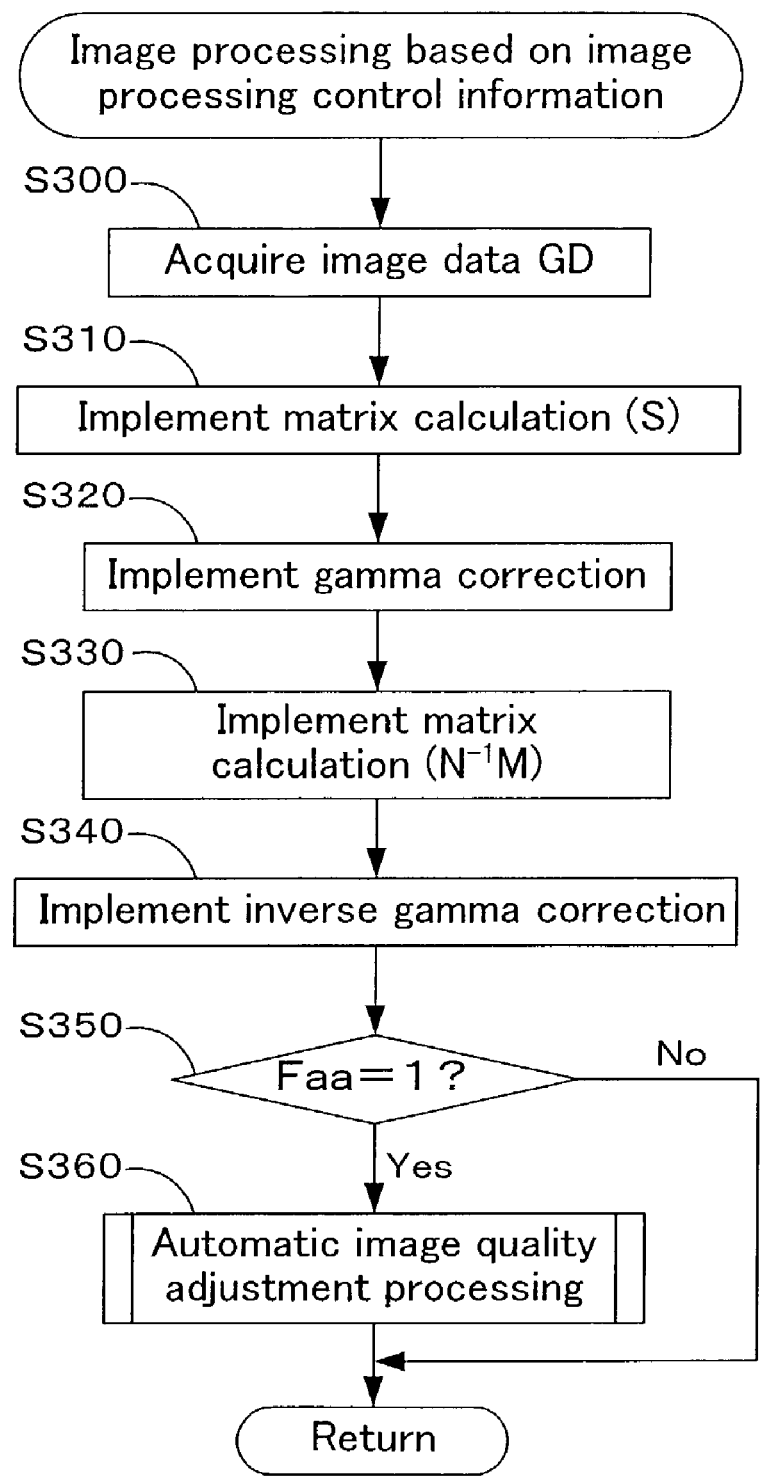
FIG. 8 is a flow chart showing the processing routine for image processing based on image processing control information carried out by the personal computer PC.
Figure 9:
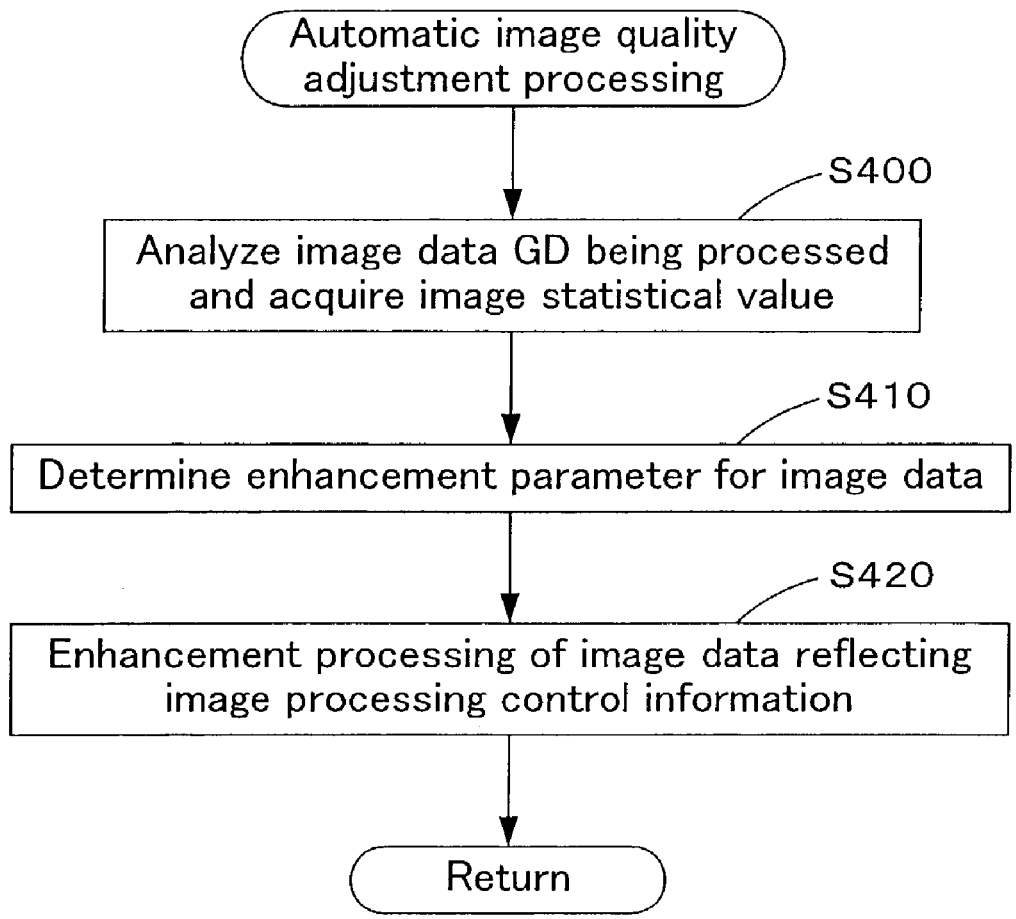
FIG. 9 is a flow chart showing the processing routine carried out during automatic image quality processing.
Figure 10:
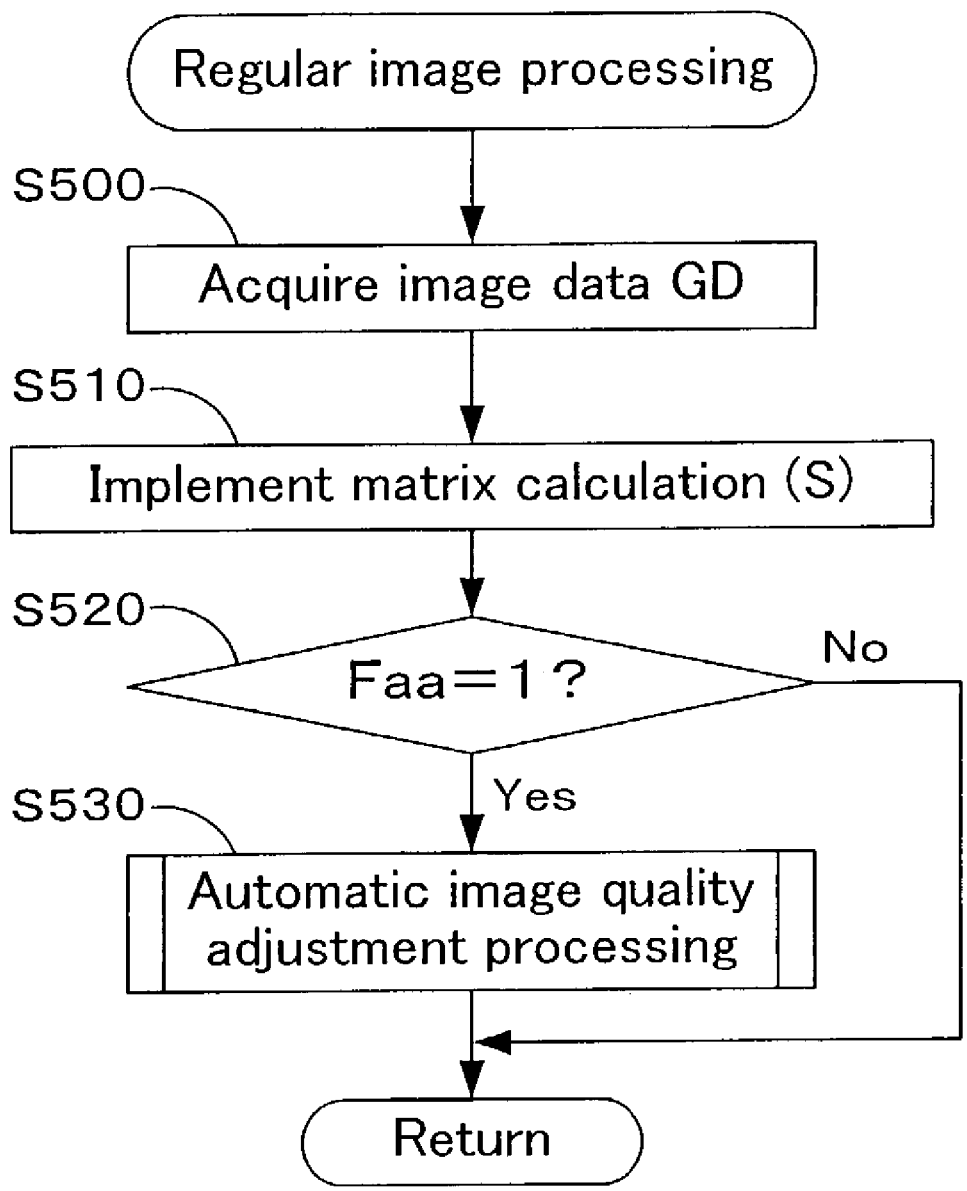
FIG. 10 is a flow chart showing the processing routine for regular image processing carried out by the personal computer PC.
Figure 11:
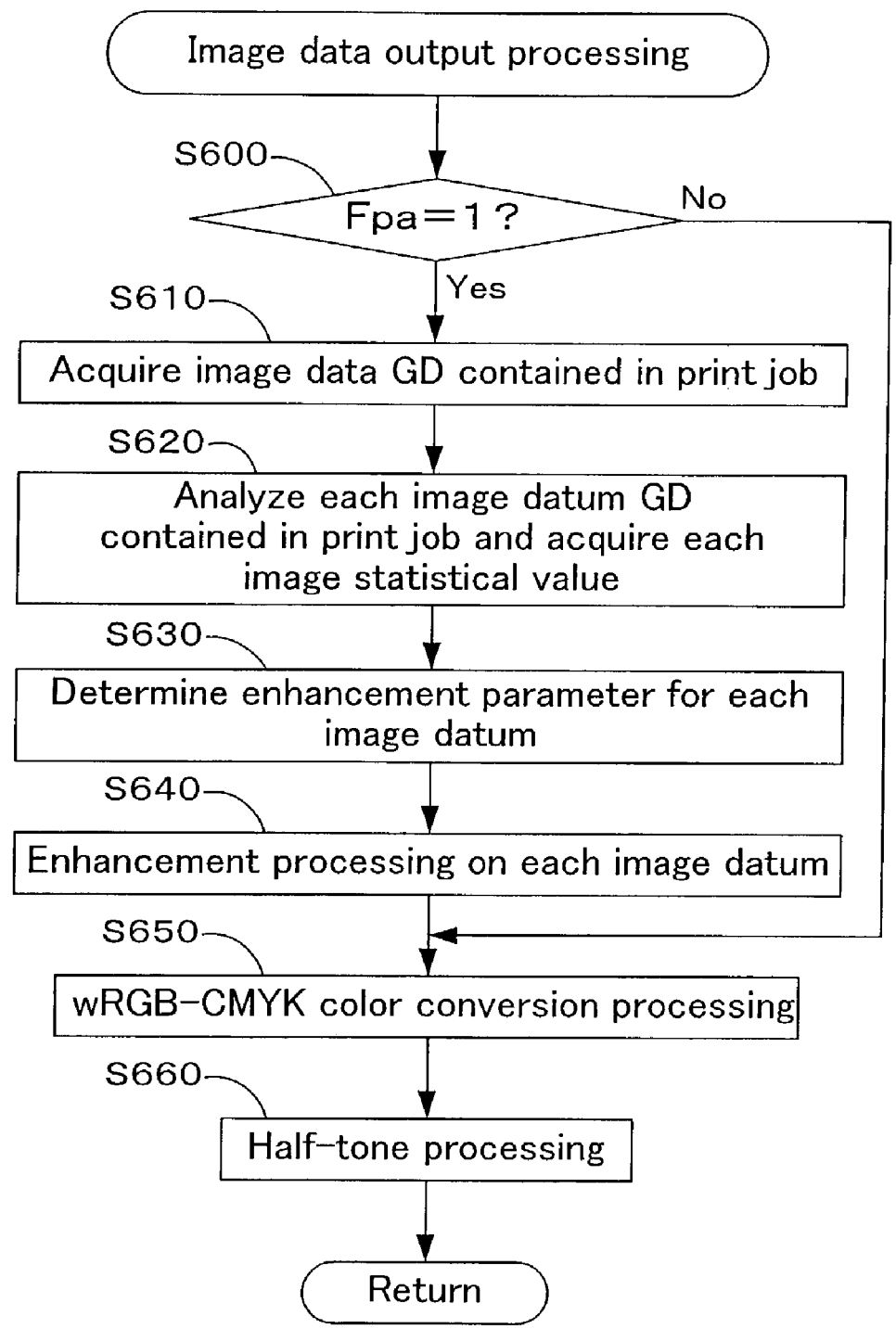
FIG. 11 is a flow chart showing the processing routine for image data output processing carried out by the personal computer PC.

C. Image Processing in the Image Processing Device According to the First Embodiment The image processing in the personal computer PC functioning as an image processing device according to the present embodiment will be described with reference to FIGS. 6 to 11. FIG. 6 is a flow chart showing the processing routine for image processing and printing control processing carried out by the personal computer PC according to the present embodiments. FIG. 7 is a flow chart showing the processing routine for image processing carried out by the personal computer PC. FIG. 8 is a flow chart showing the processing routine for image processing based on image processing control information carried out by the personal computer PC. FIG. 9 is a flow chart showing the processing routine carried out during automatic image quality processing. FIG. 10 is a flow chart showing the processing routine for regular image processing carried out by the personal computer PC. FIG. 11 is a flow chart showing the processing routine for image data output processing carried out by the personal computer PC.

An image file GF generated by the digital still camera 12 is provided to the personal computer PC through a cable or alternately through a memory card MC. When a retouching application installed on the HDD 152 or an image data processing application (program), a so-called printer driver, is started up by a user operation, the CPU 150 starts reading the image file GF.

Alternately, the image processing application may be automatically started up through a detection of the insertion of the memory card MC into the card slot 153 or the connection of the digital still camera 12 to the input/output terminal 154 through a cable, and the CPU 150 start reading the image file GF. In the present embodiment, the image processing application implements automatic image quality adjustment processing of image data GD in accordance with image processing control information GC stored in the image file GF.

When the CPU 150 reads, for example, the image file GF from the memory card MC, the read image file GF is temporarily stored in the RAM 151 (step S100). The CPU 150 sets a flag $F_{aa}$ for application automatic image quality adjustment carried out by the image processing application to 0, or in other words, turns it OFF (step S110). The CPU 150 is set by the printer driver for controlling a printing operation in the color printer 20, and the CPU 150 then acquires printing conditions stored in the RAM 151 (step S120).

The CPU 150 detects the set printing conditions, and determines whether a flag $F_{pa}$ for printer driver automatic image quality adjustment is set to 1, or in other words, is turned ON (step S130). If it is determined that $F_{pa}=1$ (step S130: Yes), the CPU 150 determines whether automatic image quality adjustment is required in the image processing application being executed (step S140). For the determination of whether automatic image quality adjustment processing is required in the application, for example, it may be determined that automatic image quality adjustment processing is required when image processing control information GC is contained in the image file GF, and it may be determined that the requirement of automatic image quality adjustment processing is cancelled when image processing control information GC is not contained in the image file GF or when arbitrary image processing is selected/executed in the image processing application. When it is determined that automatic image quality adjustment is required in the application (step S140: Yes), the CPU 150 sets the flag $F_{aa}$ to 1 in order to clearly indicate that automatic image quality adjustment is required in the application (step S150).

The CPU 150 sends a command to turn OFF ($F_{pa}$=0) the automatic image quality adjustment that is ON to the printer driver (step S150). In greater detail, as a rule, when image processing control information GC is contained in the image file GF, automatic image quality processing adjustment is not carried out by the printer driver. When it is determined in step S130 that $F_{pa}$=0 (step S130: No), or when it is determined that automatic image quality adjustment is not required in the application in step S140 (step S140: No), the CPU 150 moves to step S170.

The CPU 150 implements the image processing described below (step S170), implements image data output processing described below on image data which has already undergone image processing (step S180), and then ends the current processing routine.

Image processing will be described in detail with reference to FIG. 7. The CPU 150 searches for an image processing control tag in an appended information storage area 112 for the image file GF stored in the RAM 151 (step S200). If the CPU 150 is able to find the image processing control tag (step S210: Yes), it acquires and analyzes the image processing control information GC written at the time of the image data generation (step S220). The CPU 150 implements image processing based on image processing control information based on the analyzed image processing control information GC (step S230), and returns to the processing routine shown in FIG. 6.

If the CPU 150 cannot find the image processing control tag (step S210: No), it will not be able to implement image processing on the image data that reflects the image processing control information GC, so it implements regular image processing (step S240), and returns to the processing routine shown in FIG. 6.

Image processing based on the image processing control information GC will be described with reference to FIG. 8. The CPU 150 in the personal computer PC acquires image data GD from a read image file GF (step S300). The read image data GD is work image data (an image data copy) temporarily stored in a so-called work-area of the RAM 151, and by the time the image processing is complete, a variety of image processing will have been carried out on the work image data GD. The digital still camera 12 saves the image data already described as a JPEG formatted file, and the image data in the JPEG file is saved using a YCbCr color space in order to increase the compression ratio.

The CPU 150 implements a 3×3 matrix calculation S in order to convert the image data based on the YCrCb color space to image data based on RGB color space (step S310). The matrix calculation S is the formula shown below.

$$\begin{pmatrix} Rs \\ Gs \\ Bs \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

The CPU 150 implements gamma correction on the image data based on the RGB space thus obtained (step S320). When implementing gamma conversion, the CPU 150 acquires a gamma value for the DSC side from the image processing control information GC, and then implements gamma correction processing on the image data using the acquired gamma value. In greater detail, the gamma value also contains an image processing control parameter value specified by the image processing control information GC. The calculation formula for gamma correction is as below.

$$Rs, Gs, Bs \geq 0$$

$$Rs' = \left(\frac{Rs}{255}\right)^{\gamma} \quad Gs' = \left(\frac{Gs}{255}\right)^{\gamma} \quad Bs' = \left(\frac{Bs}{255}\right)^{\gamma}$$

$$Rs, Gs, Bs < 0$$

$$Rs' = -\left(\frac{-Rs}{255}\right)^{\gamma} \quad Gs' = -\left(\frac{-Gs}{255}\right)^{\gamma} \quad Bs' = -\left(\frac{-Bs}{255}\right)^{\gamma}$$

The CPU 150 implements a matrix calculation ($N^{-1}M$) for making a correspondence between the RGB color space obtained after the matrix S conversion and WRGB color space for the image data GD which has undergone gamma correction (step S330). The image file GF used in the present embodiment may contain color space information to be used during image processing or color space information during image generation, so when the image file GF contains color space information, the CPU 150 refers to color space information when implementing the matrix calculation ($N^{-1}M$), finds the corresponding matrix ($N^{-1}M$), and implements the matrix calculation.

The matrix calculation ($N^{-1}M$) is a combined matrix of a matrix calculation M using a matrix M for converting RGB color space to XYZ color space, and a inverse matrix calculation $N^{-1}$ of a matrix calculation N using a matrix N to convert wRGB color space to XYZ color space. The matrix M is not included in the display color area in sRGB color space, but converts image data based on sRGB color space to image data based on XYZ color space, reflecting available data (color values) as data. The matrix values of the matrix M are determined according to color space information. The inverse matrix N of the matrix N is for converting (returning to RGB color space) image data converted to image data based on XYZ color space by the matrix calculation M to wRGB color space having a area more widely defined than the sRGB color space. The XYZ color space is a machine independent color space not dependent on output characteristics of the machine, and is used to make correspondences of color values between RGB color space and wRGB color space. The matrix calculation ($N^{-1}M$) is the formula shown below.

$$\begin{pmatrix} Rw \\ Gw \\ Bw \end{pmatrix} = N^{-1}M \begin{pmatrix} Rs' \\ Gs' \\ Bs' \end{pmatrix}$$

$$N^{-1}M = \begin{pmatrix} 0.7152 & 0.2848 & 0.0001 \\ 0.0000 & 1.0001 & 0.0000 \\ 0.0000 & 0.0412 & 0.9588 \end{pmatrix}$$

The color space for the image data GD obtained after implementing the matrix calculation ($N^{-1}M$) is WRGB color space having a area more widely defined than sRGB color space. Conventionally, color space used in image processing by a printer or a computer was confined to sRGB; for example, even if the printer used a display color area containing that of the digital still camera 12 larger than sRGB color space, the color space of the digital still camera 12 could not be used effectively. In contrast to this, in the present embodiment, when the color space information is contained in the image file GF, the matrix (N⁻¹M) used in the matrix calculation M is changed in response to the color space information, so the color space in the digital still camera 12 can be used effectively, and it is possible to realize an accurate color reproduction.

The CPU 150 implements inverse gamma correction on the image data obtained by the matrix calculation (N⁻¹M) (step S340). When the gamma correction is carried out, the CPU 150 acquires the default gamma value on the printer side from the HDD 152, and implements inverse gamma conversion processing on the image data GD using the inverse number of the acquired gamma value. The formula used in inverse gamma correction is as below.

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

The CPU 150 determines whether the application automatic image quality adjustment flag $F_{aa}=1$ (step S350: Yes). If it is determined that the flag $F_{aa}=1$ (step S350: Yes), the CPU 150 implements the automatic image quality adjustment processing described below (step S360), and returns to the processing routine shown in FIG. 7. If it is determined that the flag $F_{aa}=0$ (step S350: No), however, the CPU 150 returns to the processing routine shown in FIG. 7 without implementing the automatic image quality adjustment processing.

The automatic image quality adjustment processing by the image processing application will be described with reference to FIG. 9. The CPU 150 analyzes (samples) the image data GD being processed, and acquires image statistical values showing characteristics of the image data GD (step S400). The CPU 150 determines enhancement parameters, or more specifically, parameters for adjustment, for the image data GC based on the image statistical values (step S410). A CPU 420 implements enhancement processing (image quality adjustment processing) on the image data GD using the enhancement parameters while reflecting the image processing control information GC (step S420), and returns to the processing routine shown in FIG. 8.

In the automatic image quality adjustment processing by the image processing application in the present embodiment, a standard parameter is predetermined as the target of the correction (adjustment), and the image data are corrected such that the enhancement parameter values for the image data approach or match the standard parameter values. The image processing control information GC may be used to change the standard parameter values, or used to change the degree to which the characteristic parameter values approach the standard parameter values, or in other words, change the level of the automatic image quality adjustment. As will be appreciated from the above description, the automatic image quality adjustment processing by the image processing application can be carried out reflecting the image processing control information GC by image datum. A more suitable automatic image quality adjustment can thus be carried out.

The correction of the image data with respect to, for example, the brightness, contrast, color balance, etc., is carried out by pixel using a characteristic line relating the output level and the input level of R, G and B signals generally called the tone curve, decided based on the standard parameters and enhancement parameters. Also, pixel calculation processing (filter processing), not tone curve processing, for the color saturation, sharpness, noise lowering, and the like, for example, are carried out by pixel.

Ordinary image processing will be described with reference to FIG. 10. Processing in the steps shown in FIG. 10 equivalent to that in the steps already described with reference to FIG. 8 will be described briefly.

The CPU 150 in the personal computer PC acquires image data GD from the read image file GF (step S500), and implements the 3×3 matrix calculation S (step S510) in order to convert the image data based on YCrCb color space to image data based on sRGB color space (step S510). The matrix calculation S is the formula already described.

A CPU 31 determines whether the application automatic image quality adjustment flag $F_{aa}=1$ (step S520). If it is determined that the flag $F_{aa}=1$ (step S520: Yes), the CPU 150 implements the automatic image quality adjustment processing already described (step S530), and returns to the processing routine shown in FIG. 7. If, however, it is determined that the flag $F_{aa}=0$ (step S20: No), the CPU returns to the processing routine shown in FIG. 7 without implementing automatic image quality adjustment processing.

Output processing of the image data GD, or in greater detail, printing control processing carried out by the printer driver (printing control program) will be described with reference to FIG. 11. The CPU 150 determines whether automatic image quality adjustment is required by the printer driver, or in greater detail, whether the ON printer driver automatic image quality adjustment flag $F_{pa}=1$ (step S600). If it is determined that $F_{pa}=1$ (step S600: Yes), the CPU 150 acquires image data contained in the print job (step S610), and analyzes each image datum contained in the print job to acquire statistical values for each image datum (step S620). In greater detail, the image processing by the printer driver is carried out on all the image data contained in a print job, which is the print processing unit corresponding to one print instruction, not by individual image data. Also, the image data GD contained in the print job have automatic image quality adjustment carried out by the application.

The CPU 150 determines the enhancement parameters for each image datum (step S630), and implements enhancement processing on each datum (step S640). Even for the automatic image quality adjustment processing by the printer driver, correction of the image quality is carried out based on standard parameters or enhancement parameters for each individual image datum, but image quality adjustment reflecting the image processing control information GC is not carried out.

If it is determined in step S600 that $F_{pa}=0$ (step S600: No), the automatic image quality adjustment processing will be carried out by the image processing application, and the CPU 150 moves to step S650 without implementing the automatic image quality adjustment processing. The CPU 150 implements RGB-CMYK color conversion processing for printing on the image data which has undergone either automatic image quality adjustment processing by the image processing application or automatic image quality adjustment processing by the printer driver (step S650). If the resolution of the image data GD is lower than the print resolution, then before the color conversion processing, new data may be generated between neighboring image data using linear interpolation, and conversely, if it is higher than the print resolution, resolution conversion processing may be carried out by converting the resolution of the image data to the print resolution by deleting data with a fixed ratio.

If the results of the image processing on the work image data GD thus far are to be reflected in the original image data GD, image data overwrite is selected. If the color space set at the time of image data generation is acquired from the image data GF, and the color space stored in the color space information is larger than the sRGB space, a wRGB-CMYK color conversion table, for example, may be used, and if the image processing control tag is not found, a sRGB-CMYK color conversion table is used. The CPU 150 converts the color space for the image data from wRGB color space to CMYK color space, referring to a conversion look-up table (LUT) for associating wRGB color space with CMYK color space. In greater detail, image data comprising R, G and B gradient values is converted to, for example, data with gradient values with the six colors of C, M, Y, K, LC and LM used in the color printer 20.

The CPU 150 implements half tone processing (step S660), and returns to the routine shown in FIG. 6. In the half tone processing, image data already color converted is taken and undergoes gradient number conversion processing. In the present embodiment, the image data after color conversion is expressed as data having a 256-gradient width for each color. In contrast to this, with the color printer 20 of the present embodiment, only one of the states of "form dots" or "do not form dots" may be selected, and the color printer 20 of the present embodiment can express only 2 gradients locally. The image data having 256 gradients is converted into image data expressed with 2 gradients expressible by the color printer 20. Typical methods for conversion to 2 gradients (binarization) are a method called the error diffusion method and one called the ordered dithering method. The CPU 150 implements interlace processing for rearranging the image data converted to a format showing the presence of dot formation to a sequence for transfer to the color printer 20.

According to a personal computer PC as the image processing device of the present embodiment as described above, when automatic image quality adjustment processing by the image processing application is required, or in greater detail, when the image processing control information GC is contained in the image file GF, the automatic image quality adjustment processing by the driver printer can be turned OFF, so duplicate automatic image quality adjustment processing can be prevented. An image reflecting the image processing control information GC with priority can thus be obtained as the printing result. A drop in image data image quality as well as unsuitable image quality adjustment accompanying duplicate processing of automatic image quality adjustments can also be prevented.

D. The Second Embodiment

Figure 12:
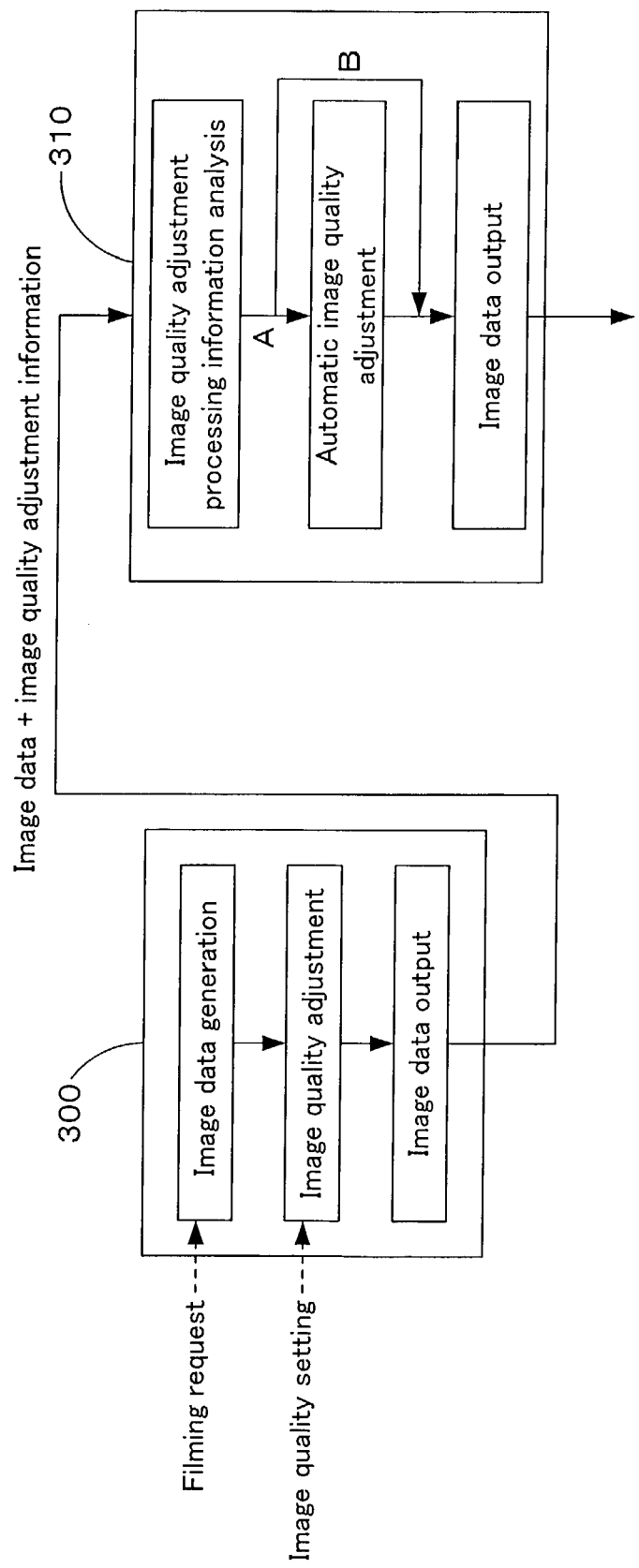
FIG. 12 is an outline view showing the outline construction of the image processing system according to the second embodiment.
Figure 13:
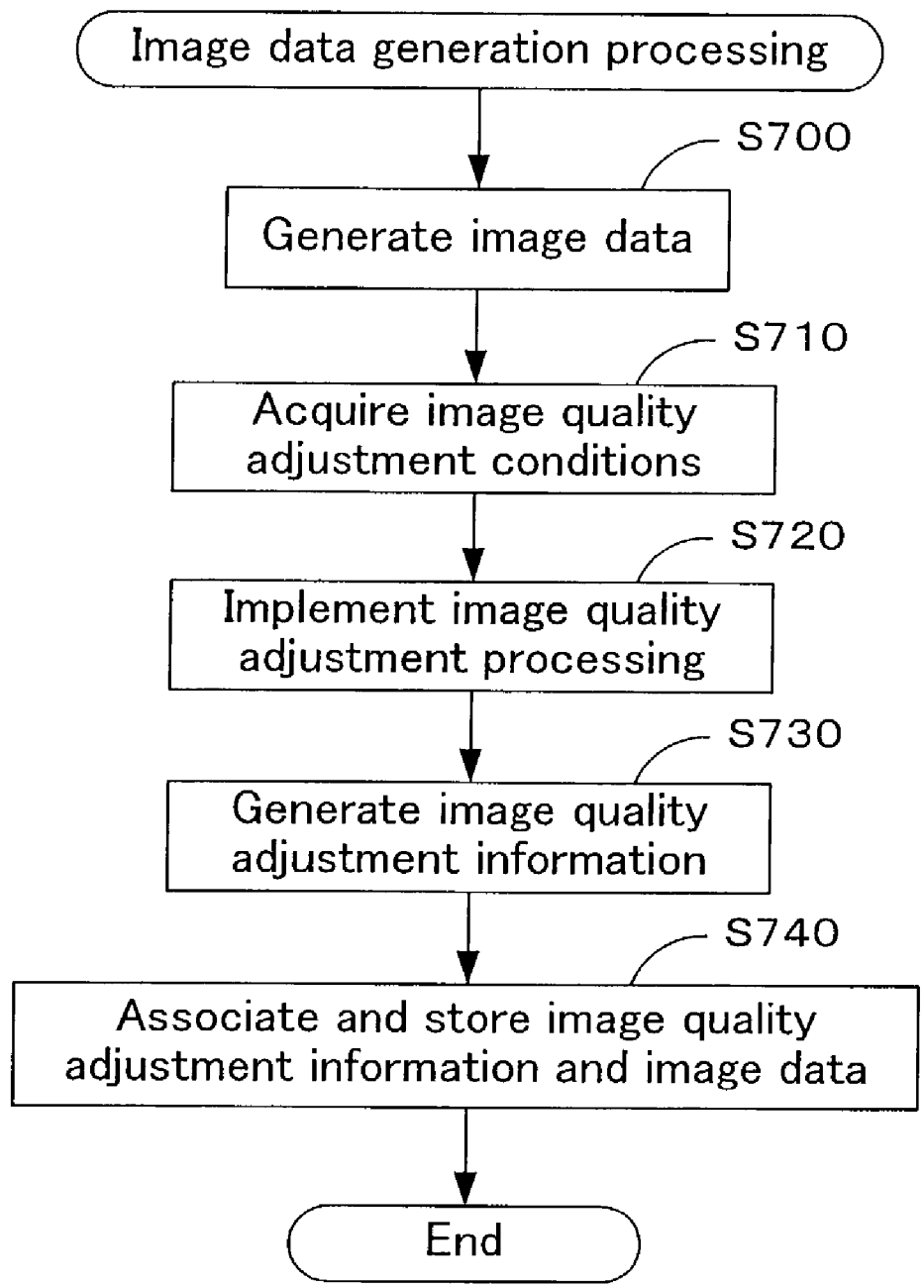
FIG. 13 is a flow chart showing the processing routine for image data generation processing carried out by the first image processing device.
Figure 14:
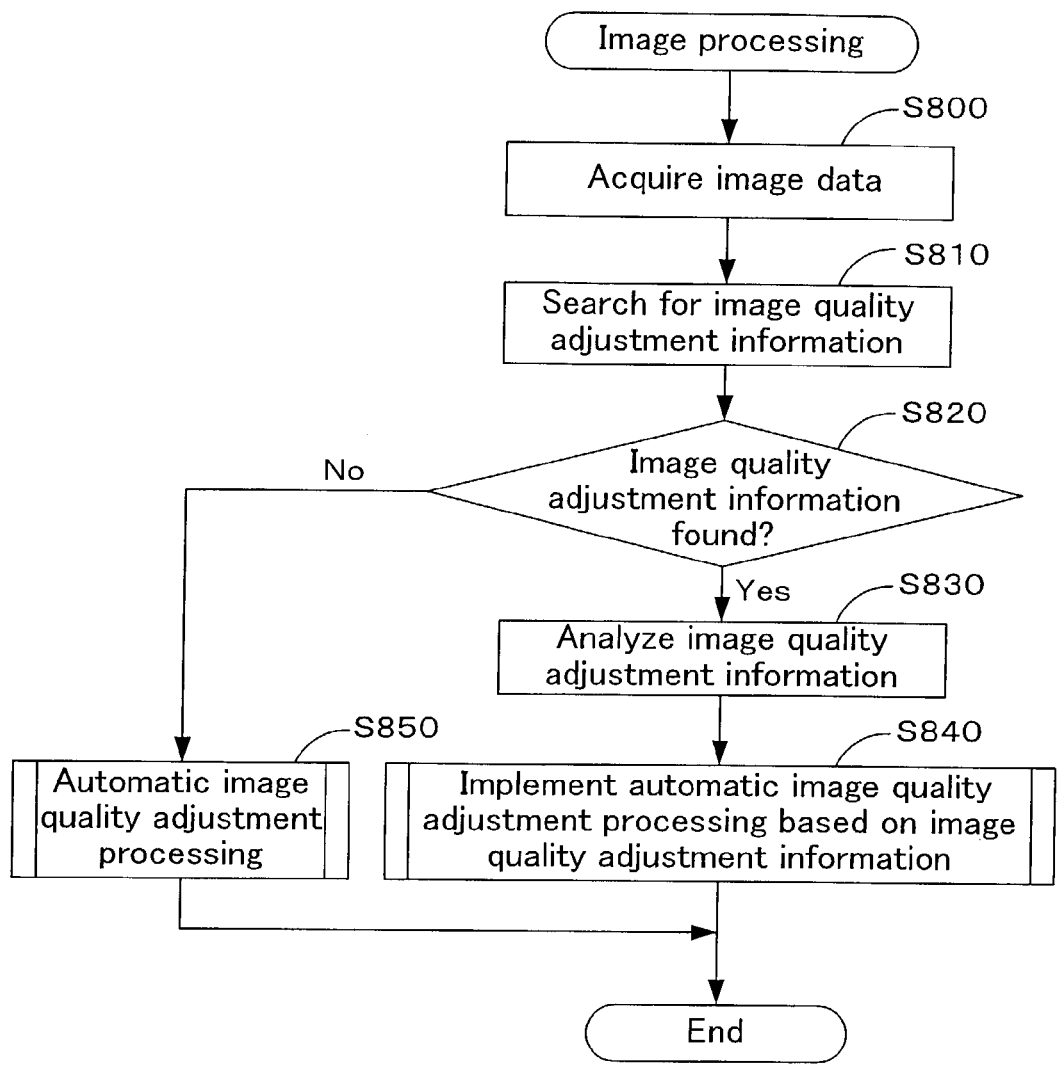
FIG. 14 is a flow chart showing the processing routine for image processing carried out by the second image processing device.

An image processing system according to the second embodiment will be described referring to FIGS. 12 to 14. FIG. 12 is an outline view showing the outline construction of the image processing system according to the second embodiment. FIG. 13 is a flow chart showing the processing routine for image data generation processing carried out by the first image processing device. FIG. 14 is a flow chart showing the processing routine for image processing carried out by the second image processing device.

The flow of image processing in the image processing system according to the second embodiment will be described with reference to FIG. 12. In a first image processing device 300, image data generation occurs when a filming request is generated. The adjustment conditions for the image quality of the generated image data are decided by setting the image quality adjustment conditions beforehand or by implementing image quality settings after filming. Image quality parameters which can be set include, for example, contrast, color saturation and sharpness.

The first image processing device 300 adjusts the image quality of the image data according to the set image quality settings, associates the adjusted image data and the image quality adjustment information, which is information for set (executed) image quality adjustment, and outputs same to a recording medium or the like for storage. The image data and image quality adjustment information may be associated and stored in one file, or may be associated and stored as different files. The image quality adjustment information may be stored, for example, as Exif data, described in the first embodiment.

In a second image processing device 310, the image data and image quality adjustment information are obtained from the recording medium or through a communication cable or the like. The second image processing device 310 analyzes the acquired image quality adjustment processing, and if automatic image quality adjustment for all of the image quality parameters is prohibited (B), the image data are outputted to an output device. If, on the other hand, automatic image quality adjustment is allowed for a part or all of the image quality parameters (A), the image data are outputted to an output device after undergoing automatic image quality adjustment. The output device mentioned here includes a variety of devices such as a printer, monitor and projector.

Also, the first image processing device 300 is an input device such as, for example, a digital still camera, digital video camera or scanner; and the second image processing device 310 is a processing device or output device such as a personal computer or stand-alone type printer. Alternately, the first image processing device 300 may be a first personal computer, and the second image processing device 310 a second personal computer. In greater detail, the second embodiment contains modes not implementing standardized processing of image quality on top of image quality adjustment processing already carried out.

Image data generation processing (image processing) carried out by the first image processing device 300 will be described in detail with reference to FIG. 13. The first image processing device (CPU) 300 generates image data in response to a filming request (step S700), and acquires set image quality adjustment conditions (step S710). In addition to conceptual conditions such as, for example, being bright, vibrant and clear, the set image quality adjustment conditions include conditions (values) directly specifying parametric values relating to image quality such as contrast, color saturation and sharpness. For conceptual image quality conditions, the relevant image quality parametric values corresponding to the set image quality conditions are set by the first image processing device 300.

The first image processing device 300 implements image quality adjustment processing on the image data based on the acquired image quality adjustment conditions (step S720). Image quality adjustment processing is carried out by adjusting the so-called tone curve (S curve), expressing the relationship between input and output values of the image data for the contrast, for example, and is carried out by adjusting the image data values using a prescribed formula for the color saturation and sharpness.

The first image processing device implements image quality adjustment processing on image data based on the acquired image quality adjustment conditions (step S720). The image quality adjustment processing is carried out for contrast by adjusting the so-called tone curve (S curve) showing a relationship between input and output values of image data, and is carried out for color saturation and sharpness by adjusting the image data value using a prescribed formula.

The first image processing device 300 generates image quality adjustment information reflecting the content of the executed image quality adjustment (step S730). Briefly, this information is, for example, that for whether a change was made or not, and in greater detail, is information for the degree of adjustment, the change ratio after adjustment, concrete numerical values used, or the like.

The first image processing device 300 associates the generated image data with the image quality adjustment information for storage on a recording medium (step S740), and ends the current processing routine. According to the first image processing device 300, then, information for image quality adjustment processing carried out on the image data is associated with the image data, stored and outputted.

Image processing carried out by the second image processing device 310 is described in detail with reference to FIG. 14. The second image processing device (CPU) 310 acquires image data (step S800), and searches for image quality adjustment information associated with the acquired image data (step S810). If the image quality adjustment information is found (step S820: Yes), the second image processing device 310 acquires the image quality adjustment information and implements an analysis (step S830).

The second image processing device 310 implements automatic image quality adjustment processing based on the results of the image quality adjustment information analysis (step S840), and ends the current processing routine. In more concrete terms, the second image processing device 310 analyzes the image quality adjustment information, and determines whether information for the image quality parameters such as, for example, contrast, color saturation and sharpness are noted, or in greater detail, whether image quality adjustment processing has been carried out on the image data for which image parameters. The second image processing device 310 does not implement automatic image quality adjustment processing corresponding to image quality parameters for which it is determined that image quality adjustment processing has already been carried out based on the noted image quality adjustment information, but implements automatic image quality adjustment processing corresponding only to those image quality parameters for which image quality adjustment processing has not been carried out.

The automatic image quality adjustment processing is correction processing for eliminating or decreasing the difference between the standard image quality and the image quality of the image data which are the object of the image processing; for example, correction is carried out such that the image quality parametric values such as contrast and the like approach the standard values. In other words, the automatic image quality adjustment processing is standardization processing for causing the image quality of image data to approach the standard image quality. In more concrete detail, contrast is handled by causing the shape of the tone curve to approach the standard curve, and color saturation and sharpness are handled by implementing a calculation with consideration of the standard values. During the automatic image quality adjustment processing, the object image data may be analyzed to acquire characteristics of the image data, and the level of correction changed using the acquired characteristics. In such a case, it is possible to implement more suitable automatic image quality adjustment processing of image data by each image datum.

If image quality adjustment information is not found (step S820: No), the second image processing device 310 implements automatic image quality adjustment processing based on the standard values for all the image quality parameters prepared in advance (step S850), and ends the current routine.

Image data for which image processing (image quality adjustment processing) has been carried out by the second image processing device 310 is outputted to a printer, monitor or the like.

As described above, according to the second image processing device 310, image quality adjustment information associated with the image data is used to determine whether image quality adjustment processing has already been carried out on the image data, and automatic image quality adjustment processing based on standard values is not carried out for image quality parameters (image quality items) for which image quality adjustment processing has already been carried out. On the other hand, automatic image quality correction processing is carried out based on standard values for image quality parameters (image quality items) for which image quality adjustment processing has not yet been carried out. This means that it is thus possible to prevent duplicate image quality adjustment processing, preventing a drop in image quality, and the optimization of image quality of image data can be provided by implementing image quality adjustment processing not duplicated.

In the second embodiment, no automatic image quality adjustment processing is carried out for image quality parameters which have already undergone image quality adjustment processing, but it may be carried out after lowering the level of automatic image quality adjustment processing. In such a case, it is possible to provide a drop in image quality, and optimization of image quality corresponding to image quality parameters for which image quality adjustment processing has already been carried out can be provided.

In the second embodiment, it is determined whether image quality adjustment processing has been carried out already for each image quality parameter, and automatic image quality adjustment processing is carried out or not carried out for each image quality parameter, but if image quality adjustment processing has already been carried out for any image quality parameter, it is fine to implement automatic image quality adjustment processing for all image quality parameters. In such a case, rapidity in image quality adjustment processing can be provided for in the second image processing device 310.

Also, image quality parameters such as contrast, color saturation and sharpness are exemplifications; processing may be carried out similarly for image quality corresponding to other image quality parameters such as color balance, highlight point, brightness and the like.

E. Other Embodiments

In the embodiments, to reflect the image processing control information GC, so-called automatic image quality adjustment processing is carried out by analyzing the image processing control information GC, acquiring image quality adjustment parameters and changing the standard values and level; however, image processing may also be carried out by directly correcting the image quality parameters based on the image processing control information GC. In that case, it is favorable if the image processing control information GC has information for what level to change the image quality parameters, for example, to increase the brightness image quality parameter value+10, or to increase the brightness image quality parameter value+10%. In greater detail, if the image file GF contains image processing control information GC, the information processing may be carried out according to parametric values such as, for example, contrast, color saturation and sharpness set in the image processing control information GC, and prohibit image quality adjustment by the printer driver.

In the embodiments, when automatic image quality adjustment processing is carried out by an image processing application, or in greater detail, when image processing control information GC is contained in the image file GF, automatic image quality adjustment procession by the printer driver is prohibited, but the level of the automatic image quality adjustment processing by the printer driver may be decreased as well. In such a case as well, image processing may be realized giving priority to the image processing control information GC.

In the embodiments, image processing is carried out using an image processing application operated on a personal computer PC, and dot patterns are formed on a print medium according to image data GD generated by a printer driver operating similarly on the personal computer PC, but all or a part of the image processing may also be carried out on the color printer 20 or on a server through a network. In this case, an image processing or printing control processing application (program) such as a retouching application or printer driver is stored in a ROM in the color printer 20, on a HDD, etc., so execution is possible similar to the case using the personal computer PC. In the color printer 20, the application can be automatically started up by detecting the insertion of a memory card MC or by detecting the insertion of a cable, and the reading of the image file GF, analysis of the image processing control information GC, and conversion and adjustment of the image data GD may be carried out automatically.

Further, the characteristic parametric values for implementing image quality automatic adjustment may be made selectable as well. For example, a parameter selection button on the color printer 20, or a selection button for filming mode parameters combined with prescribed parameters in response to the photography object may be provided, and the selection button may be used to select parameters for implementing image quality automatic adjustment. Also, if the image quality automatic adjustment is carried out on a personal computer, parameters may be selected for implementing image quality automatic adjustment using a printer driver or a user interface in a retouching application.

In the embodiments, automatic image quality adjustment processing by an image processing application is given priority, and automatic image quality adjustment processing by a printer driver is cancelled depending on the image processing application; conversely, however, automatic image quality adjustment processing by a printer driver may be given priority, and automatic image quality adjustment processing by an image processing application may be cancelled depending on the printer driver as well. In either case, it is possible to prevent duplication of automatic image quality adjustment processing. Also, even when the processing results of one image processing application are received, and another image processing application for implementing further image processing is installed on the same personal computer PC, it is possible to prevent duplication of automatic image quality adjustment processing through application of the present invention.

Further, the present invention may be realized through an image processing application blending an image processing application and a printer driver. In such a case, there is no distinction between automatic image quality adjustment processing by the image processing application and automatic image quality adjustment processing by the printer drier, so, for example, automatic image quality adjustment processing may be separated according to execution by image datum or print job. For example, automatic image quality adjustment processing by print job is effective for convenient image quality adjustment on the image data as a group, and automatic image quality adjustment processing by image datum is effective for image quality with higher precision.

In the embodiments, the color printer 20 is used commonly as the output device, but a CRT, LCD, projector or other display device may also be used as the output device. In such a case, an image processing program (display driver) for implementing image processing described using, for example, FIGS. 6 to 11 is carried out by the display device as the output device. Alternately, if a CRT or the like functions as the display device for the computer, the image processing program is executed by the computer. The final outputted image data, though, has RGB color space, not CMYK color space.

In such a case, just as information from the time of the image data generation is reflected in the printing results through the color printer 20, the image processing control information GC from the time of the image data generation can be reflected in the display results in the CRT or other such display device. The image data GD generated by the digital still camera 12 can thus be displayed more accurately.

Above, an output device, image processing device, and program were described according to the present invention based on the embodiments; however, the modes worked for the invention are for the purpose of facilitating understanding of the present invention, and do not limit the present invention. The present invention may be changed and improved without deviating from its main gist or from the Scope of claims, and the present invention of course contains items equivalent thereto.

In the embodiments, the parameters light source, exposure adjustment quantity, target color space, brightness and sharpness were used as the image quality control information GC, but it is an arbitrary decision as to which parameters to use as the image processing control information GC.

Also, the values of the matrices S and $N^{-1}M$ in the formulas are merely exemplifications, and it goes without saying that they may be arbitrarily changed according to the target color space, color space available in the color printer 20, etc.

The embodiments were described using the digital still camera 12 as the image file generation device, but a scanner, digital video camera or the like may also be used. If a scanner is used, the specification of the read data information of the image file GF may be carried out on the computer PC, or alternately, a preset button assigned for preset information for setting information in the scanner, a display screen for making arbitrary settings, or a setting button may be provided, with the scanner implementing the specification.

The embodiments were described with an Exif formatted file given as a concrete example of the image file GF, but the format of the image file according to the present invention is not limited thereto. In greater detail, it is fine to have an image file containing image data generated by the image data generation device and image processing control information GC mentioning the conditions (information) at the time of the image data generation. With such a file, it is possible to suitably automatically adjust the image quality of the image data generated by the image file generation device and output same from the output device.

The embodiments were described using the case where the image data GD and the image processing control information GC were contained in one image file GF as an example; however, the image data GD and the image processing control information GC do not necessarily need to be stored in the same file. In greater detail, it is favorable if the image data GD and the image processing control information GC are associated; for example, association data for associating the image data GD and the image processing control information GC may be generated, one or a plurality of the image data and the image processing control information GC stored in independent files, and the associated image processing control information GC referred to when processing the image data GD. In such a case, even though the image data and the image processing control information GC are stored in separate files, when image processing using the image processing control information GC, the image data and the image processing control information GC have an inseparable relationship because they function substantially similarly to the case where they are stored in the same file. In greater detail, a mode using association between the image data and the image processing control information GC includes the image file GF in the present embodiments at least at the point of image processing. Further, video files stored on an optical medium such as a CD-ROM, CD-R, DVD-ROM or DVD-RAM are also included.

The invention claimed is:

1. A computer readable medium storing a computer program code for controlling an output state of image data in a printing device, the computer readable medium comprising:
   a computer program code for analyzing the image data, and acquiring characteristic parameters showing characteristics of the data; and
   a computer program code for selectively implementing either adjustment of image quality of the image data on a per print job basis with consideration of the acquired characteristic parameters, or adjustment of image quality of the image data using an image processing program for adjusting image quality of the image data on a basis of individual image data with consideration of the characteristic parameters.

2. A computer readable medium storing a computer program code for implementing image processing on image data, the computer readable medium comprising:
   a computer program code for analyzing the image data and acquiring characteristic parameters showing characteristics of the image data; and
   a computer program code for selectively implementing either adjustment of image quality of the image data on a basis of individual image data with consideration of the acquired characteristic parameters, or adjustment of image quality of the image data on a per print job basis using a printing control program for controlling a print state of the image data.

3. A computer readable medium storing a computer program code for implementing image processing on an image file containing image data, the computer readable medium comprising:
   a computer program code for analyzing the image data and acquiring characteristic parameters showing characteristics of the image data;
   a computer program code for adjusting image quality of the image data on a basis of individual image data with consideration of the acquired characteristic parameters;
   a computer program code for adjusting the image data on a per print job basis with consideration of the acquired characteristic parameters, and
   a computer program code for giving priority to image quality adjustment by the computer program code for adjusting image quality of the image data on the basis of individual image data over image quality adjustment by the computer program code for adjusting the image data on the per print job basis.

4. A computer readable medium storing a computer program code for implementing image processing on image data, the computer readable medium comprising:
   a computer program code for implementing a first image quality adjustment on the image data using image processing control information showing image processing conditions for image data,
   a computer program code for analyzing the image data, acquiring characteristic parameters showing characteristics of the image data, and implementing a second image quality adjustment on the image data using the acquired characteristic parameters, and
   a computer program code for prohibiting or decreasing image quality adjustment on image data by the computer program code for implementing second image quality adjustment when the image processing control information is associated with the data.

5. A printing control device for controlling output states of image data in a printing device, the printing control device comprising:
   a characteristic parameter acquisition unit for analyzing the image data and acquiring characteristic parameters showing characteristics for the image data;
   image quality adjustment unit for adjusting image quality of image data on a per print job basis with consideration of the acquired characteristic parameters;
   duplicate image quality adjustment prevention unit for selectively allowing either image quality adjustment by an image processing operation for implementing image quality adjustment of the image data on a basis of individual image data with consideration of the characteristic parameters, or image quality adjustment by the image quality adjustment unit to be carried out; and
   transmission unit for transmitting the image quality adjusted image data to a printing device.

6. An image processing device for implementing image processing on an image file containing image data, the image processing device comprising:
   characteristic parameter unit for analyzing the data and acquiring characteristic parameters showing characteristics of the image data;
   image quality adjustment unit for adjusting image quality of the image data on a basis of individual image data with consideration of the acquired characteristic parameters;
   image quality adjustment allowance unit for selectively allowing either image quality adjustment of the image data on a per print job basis by a printing control operation for controlling print states of image data, or image quality adjustment by the image quality adjustment unit; and transmission unit for transmitting image data whose image quality has been adjusted by the allowed image quality adjustment to the print device.

7. An image processing device for implementing image processing on an image file containing image data, the image processing device comprising:
  characteristic parameter acquiring unit for analyzing the image data and acquiring characteristic parameters showing characteristics of the image data;
  first image quality adjustment unit for adjusting image quality of the image data on a basis of individual image data with consideration of the acquired characteristic parameters;
  second image quality adjustment unit for adjusting image quality of the image data on a per print job basis with consideration of the acquired characteristic parameters;
  first priority unit for giving priority to image quality adjustment by the first image quality adjustment unit over image quality adjustment by the second image quality adjustment unit; and
  transmission unit for transmitting image data having undergone the image quality adjustment to a printing device.

8. A printing control method for controlling output states of image data in a printing device, the printing control method comprising:
  analyzing the image data and acquiring characteristic parameters showing characteristics of the image data; and
  selectively implementing either adjustment of image quality of the image data on a per print job basis with consideration of the acquired characteristic parameters, or adjustment of image quality of the image data by an image processing program for adjusting image quality of the image data on a basis of individual image data with consideration of the characteristic parameters.

9. A printing control method in accordance with claim 8, wherein the implementing of either adjustment of image quality of the image data on the per print job basis or adjustment of image quality of the image data on the basis of individual image data includes,
  determining whether image quality adjustment of the image data by the image processing program was implemented, and
  not implementing image quality adjustment by the print job when it is determined that image quality adjustment for the image data by the image processing program has been implemented.

10. A printing control method in accordance with claim 8 or 9 wherein
  image processing control information used during image processing is associated with the image data, and
  adjustment of image quality of the image data is carried out using the image processing control information.

11. An image processing method for implementing image processing on an image file containing image data, the image processing method comprising:
  analyzing the image data and acquiring characteristic parameters showing characteristics of the image data; and
  selectively implementing either adjustment of image quality of the image data on a basis of individual image data with consideration of the acquired characteristic parameters, or adjustment of image quality of the image data using a printing control program for controlling printing states of the image data for adjusting image quality of the image data on a per print job basis with consideration of the characteristic parameters.

12. An image processing method in accordance with claim 11, wherein the step of implementing either adjustment of image quality of the image data on the per print job basis, or adjustment of image quality of the image data on the basis of individual image data includes,
  determining whether image quality adjustment by the printing control program has been implemented,
  canceling a selection of image quality adjustment by the printing control program and prohibiting image quality adjustment on the per print job basis on the image data when it is determined that image quality adjustment by the printing control program has been implemented, and
  implementing image quality adjustment on the basis of individual image data on the image data.

13. An image processing method in accordance with claim 11, wherein the step of implementing either adjustment of image quality of the image data on the per print job basis, or adjustment of image quality of the image data on the basis of individual image data includes,
  determining whether image quality adjustment by the printing control program has been implemented, and
  prohibiting the image quality adjustment on the basis of individual image data when it has been determined that image quality adjustment by the printing control program has been implemented.

14. An image processing method in accordance with claim 12 or 13, wherein the image data are associated with image processing control information used during image processing, and
  the step of implementing image quality adjustment on the basis of individual image data on the image data is carried out using the image processing control information.

15. An image processing device for implementing image processing on image data associated with image process control information designating image quality adjustment processing in the image processing device, the image processing device comprising:
  image quality adjustment unit for adjusting image quality of the image data based on a predetermined standard; and
  image quality adjustment limiting unit for prohibiting or decreasing image quality adjustment on the image data by the image quality adjustment unit based on the image process control information associated with the image data.

16. An image processing device in accordance with claim 15, wherein the image process control information contains adjustment information related to image quality of at least one out of contrast, color saturation and sharpness, and
  the image quality adjustment limiting unit prohibits or decreases adjustment of image quality corresponding to adjustment information related to image quality contained in the image process control information.

17. An image processing system for implementing image processing on image data, the image processing system comprising:
  a first image processing device including
  image data acquisition unit for acquiring image data;
  first image quality adjustment unit for implementing image quality adjustment on the acquired image data; and
  an output unit for associating image data which has undergone the image quality adjustment and image process control information designating the image quality adjustment processing, and outputting same;

a second image processing device including acquisition unit for acquiring the outputted image data and the image process control information associated with the image data;

second image quality adjustment unit for adjusting image quality of the image data based on a predetermined standard; and image quality adjustment limiting unit for prohibiting or decreasing image quality adjustment on the image data by the second image quality adjustment unit based on the image process control information associated with the image data.

18. An image processing system in accordance with claim 17, wherein image quality adjustment processing implemented by the first image quality adjustment unit in the first image processing device includes image quality adjustment processing relating to at least one image quality out of contrast, color saturation and sharpness, the image process control information contains adjustment information relating to one image quality out of the executed contrast, color saturation and sharpness, adjustment of image quality of the image data based on a predetermined standard carried out by the second image quality adjustment unit in the second image processing device contains adjustment of image quality relating to at least one image quality out of contrast, color saturation and sharpness, and image quality limitation unit in the second image processing device prohibits or decreases adjustment of image quality corresponding to adjustment information contained in the image process control information.

19. An image processing system in accordance with claim 18, wherein the first image processing device is a digital still camera, and the second image processing device is a personal computer or a printer.

20. A method for implementing image processing on image data, the method comprising:

determining whether image process control information designating image quality adjustment processing in an image processing device has been associated with acquired image data; and prohibiting or decreasing adjustment of image quality of the image data based on a predetermined standard when the image process control information is associated with the acquired image data.

21. A method of claim 20, wherein the image process control information includes information for image quality adjustment relating to at least one image quality out of contrast, color saturation and sharpness, a determination of whether the image process control information is associated with acquired data is carried out for each piece of information in every image quality adjustment, and a prohibition or decrease in adjustment of image quality of the image data based on the predetermined standard is carried out for each piece of information in each image quality adjustment contained in the image process control information.

22. An image processing method for implementing image processing on image data, the processing method comprising:

acquiring image data and implementing image quality adjustment on image data;

associating image data having undergone the image quality adjustment and image process control information designating image quality adjustment processing in an image processing device and outputting same;

acquiring the outputted image data and the image process control information associated with the image data; and prohibiting or decreasing adjustment of image quality for the image data based on a predetermined standard based on the image process control information associated with the image data.

23. A computer readable medium storing a computer program code for implementing image processing on image data to which image process control information designating image quality adjustment processing in an image processing device is associated, the computer readable medium comprising:

a computer program code for adjusting image quality of the image data based on a predetermined standard; and a computer program code for prohibiting or decreasing image quality adjustment on the image data by a function for adjusting the image quality based on the image process control information associated with the image data.

24. A method of implementing image processing on an image file containing image data, the method comprising:

analyzing the image data and acquiring characteristic parameters showing characteristics of the image data;

adjusting image quality of the image data on a basis of individual image data with consideration of the acquired characteristic parameters;

adjusting the image quality of the data on a per print job basis with consideration of the acquired characteristic parameters, and giving first priority to image quality adjustment by the step of adjusting image quality of the image data on the basis of individual image data over image quality adjustment by the step of adjusting the image quality of the data on the per print job basis.

25. A method as recited in claim 24, wherein the step of giving first priority is decreasing a level of image quality adjustment by the step of adjusting the image quality of the data on the per print job basis.

26. A method as recited in claim 24, wherein the step of giving first priority is prohibiting image quality adjustment by the step of adjusting the image quality of the data on the per print job basis.

27. A method as recited in claim 24 further comprising:

giving second priority to image quality adjustment by the step of adjusting the image quality of the data on the per print job basis over image quality adjustment by the step of adjusting image quality of the image data on the basis of individual image data.

28. A method as recited in claim 27, wherein the step of giving second priority is decreasing a level of image quality adjustment by the step of adjusting image quality of the image data on the basis of individual image data.

29. A method as recited in claim 27, wherein the step of giving second priority is prohibiting image quality adjustment by the step of adjusting image quality of the image data on the basis of individual image data.

* * * * *